United States Patent [19]
Sekine et al.

[11] 3,968,558
[45] July 13, 1976

[54] APPARATUS FOR AND METHOD OF AUTOMATICALLY ASSEMBLING AN AUTOMOBILE BODY STRUCTURE

[75] Inventors: Yoshitada Sekine, Ohme; Tsuneo Fujikawa, Ebina, both of Japan

[73] Assignee: Nissan Motor Co., Ltd., Japan

[22] Filed: Dec. 11, 1974

[21] Appl. No.: 531,813

[30] Foreign Application Priority Data
Dec. 14, 1973    Japan.............................. 48-138800

[52] U.S. Cl................................ 29/429; 29/200 A; 29/200 P; 29/208 R
[51] Int. Cl.²..................... B23P 21/00; B23P 19/04
[58] Field of Search................. 29/429, 430, 200 R, 29/200 A, 200 J, 200 P, 208 R

[56]    References Cited
UNITED STATES PATENTS

| | | | |
|---|---|---|---|
| 1,877,653 | 9/1932 | Fageol | 29/430 |
| 1,893,456 | 1/1933 | Sykes et al. | 29/200 R |
| 2,779,092 | 1/1957 | Gordon | 29/430 |
| 3,574,920 | 4/1971 | Stirling et al. | 29/200 A |
| 3,705,679 | 12/1972 | Tenpas | 29/200 P |

Primary Examiner—Carl E. Hall
Assistant Examiner—Dan C. Crane
Attorney, Agent, or Firm—Robert E. Burns; Emmanuel J. Lobato; Bruce L. Adams

[57]    ABSTRACT

An apparatus for and a method of automatically assembling a body structure of an automobile body, in which side panels are downwardly conveyed into first temporary positions over a floor panel and adjacent jig means, adjusted for proper positions relative to the jig means, moved into second temporary positions, clamped by the jig means, moved from the second temporary positions into final working positions ready to be welded to the floor panel which has been conveyed into a working position thereof, and welded to the floor panel into a unitary structure. The side panels are initially held in positions horizontally close to each other and are gradually moved toward positions horizontally spaced wider from each other as the side panels are conveyed downwardly. The apparatus and method may be modified so that not only the floor panel and the side panels by a cowl-and-dash-panel subassembly and/or a parcel shelf member are assembled together.

13 Claims, 22 Drawing Figures

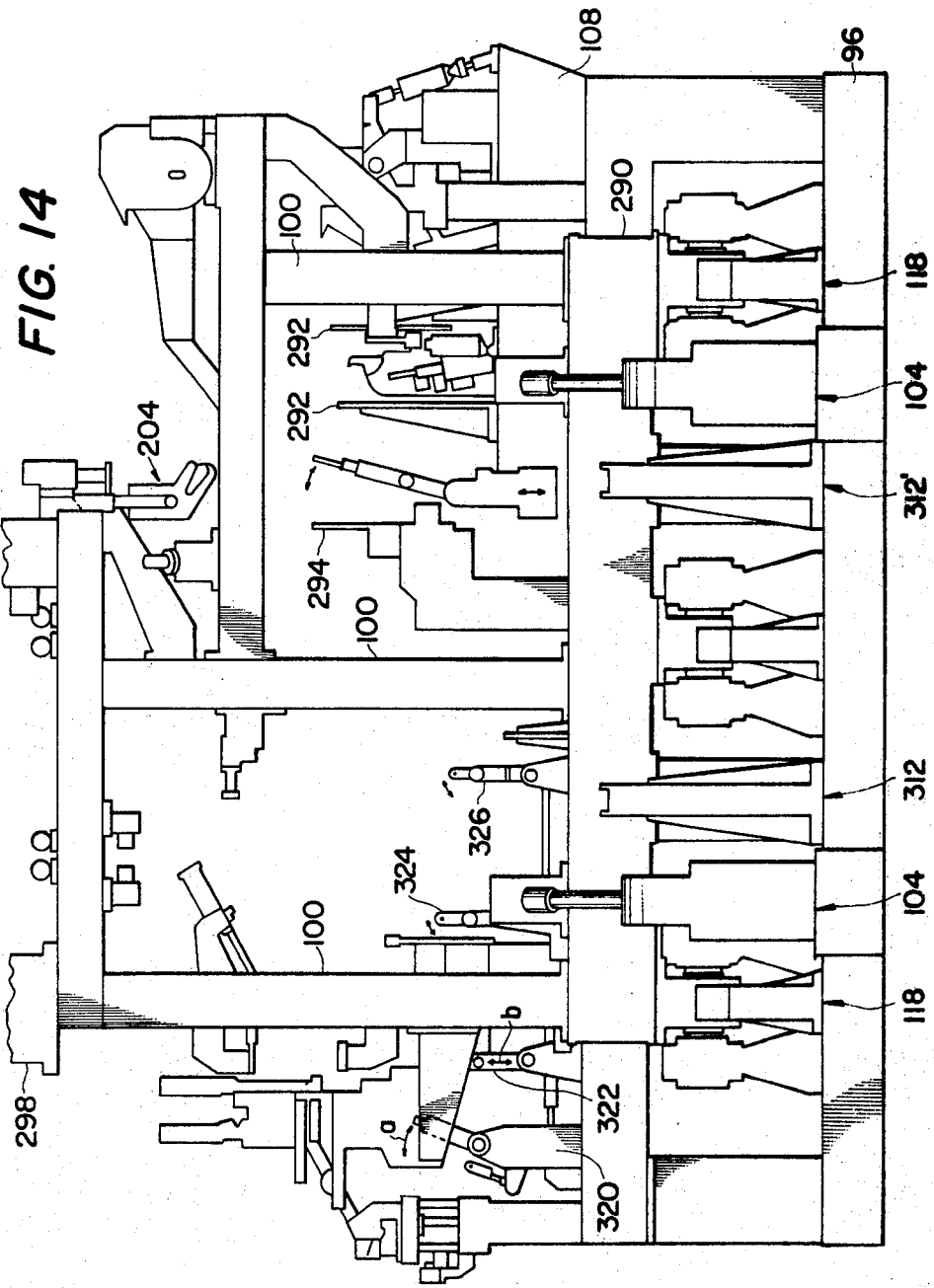

APPARATUS FOR AND METHOD OF AUTOMATICALLY ASSEMBLING AN AUTOMOBILE BODY STRUCTURE

The present invention relates to an apparatus for and a method of automatically assembling an automobile body structure from a floor panel and a pair of side panels or, if desired, from a cowl-and-dash-panel subassembly and a parcel shelf member in addition to the floor panel and the side panels.

For the assemblage of an automobile body structure from a floor panel and side panels, it is a usual practice to have the side panels vertically conveyed by suitable lift means such as a hoist into predetermined positions relative to an assembling jig mechanism. The side panels thus moved into the predetermined positions are removed from the lift means and mounted and clamped on the jig mechanism by a human labor. The positions of the side panels relative to the jig mechanism are then accurately adjusted by manually moving the side panels into predetermined positions in which the positioning pins provided in the jig mechanism are in strict alignment with positioning openings formed in the side panels. Thus, it has been considered extremely difficult to assemble the automobile body structure in a completely automated fashion. This is because of the fact that (1) substantially no clearance is lowered between the positioning pins of the jig mechanism and the positioning holes in the side panels so that an extreme difficulty is encountered in positioning the side panels in strict alignment with the positioning pins of the jig mechanism, (2) the positions of the side panels relative to the lift means are not practically fixed, and (3) the side panels suspended from the lift means tend to swing while they are being conveyed to the positions ready to be mounted on the jig mechanism so that the positions of the side panels to be passed from the lift means to the jig mechanism tend to vary from one conveying operation to another. These problems could be solved if the lift means is so designed and engineered to provide sufficiently high performance accuracy but, for this purpose, a prohibitively high production cost will be required because of the elaborately instrumented position adjustment mechanism which must be incorporated into the lift means. Another reason accounting for the impossibility of automating the assemblage of the automobile body structure is that, since the jig mechanism which has been in common use is so arranged as to mainly serve the purpose of accurately holding the side panels in position, the jig mechanism is composed of a tremendously great number of components and parts most of which are movable so that it is difficult to provide an ample space for accommodating the movement of the side panels conveyed in vertical direction.

An advanced method of assembling the automobile body structure has therefore been proposed, in which the side panels are temporarily and releasably combined together by the use of suitable clamping means such as clips and hand vices prior to the actual assembling operation and the body structure thus temporarily assembled and conveyed in a horizontal direction into a welding station in which the breakdowns constituting the body structure are finally adjusted for proper relative positions and welded together. Additional steps and devices are thus required for the clamping of the side panels and the floor panel and for the conveyance of the temporarily assembled body structure to the welding station. Not a small amount of human labour will be required for combining the breakdowns by the use of the clips and hand vices.

Assembling the automobile body structures by relying upon human labour will apparently result in not only the requirement for a number of skilled operators but individual errors in the qualitie of the final product. The present invention contemplates elimination of all the above mentioned problems which have thus far been inherent in the assemblage of the automobile body structures.

It is, accordingly, an important object of the present invention to provide a method of completely automatically assembling an automobile body structure. Another important object of the invention is to provide an apparatus to put the method into practice.

In accordance with the present invention, there is provided an automatic body assembling apparatus which comprises in combination first conveying means for moving a floor panel into a predetermined substantially horizontal working position, jig means including at least one pair of elongate rockable members which are rockable about respective axes located in the vicinity of the lower ends of the rockable members and extending substantially in parallel to the fore-and-aft direction of the automobile body structure to be assembled, the rockable members being rockable between substantially upright positions on both sides of the body structure to be assembled, and inclined positions which are inclined away from each other about the axes of rotation of the rockable members, second conveying means for concurrently moving a pair of side panels downwardly into first predetermined temporary positions between and adjacent to the rockable members in the inclined positions, first guiding and positioning means mounted on each of the rockable members and engageable with the lower end of the side panel adjacent to the rockable member for guiding the lower end of the side panel into a predetermined lateral position relative to the associated rockable member held in the inclined position thereof, manipulating means mounted on each of the rockable members and engageable with a predetermined upper portion of the associated side panel for supporting the side panel with the lower end of the side panel held in the predetermined lateral position, second guiding and positioning means mounted on each of the rockable members and engageable with at least one predetermined portion of the associated side panel for guiding the side panel into a predetermined fore-and-aft direction relative to the associated rockable member in the inclined position so that the side panels are moved into second predetermined temporary positions, position holding means mounted on each of the rockable members and movable into locking engagement with the associated side panel in the second predetermined temporary positions thereof, the rockable members being held in the inclined positions when the side panels are being moved from the first predetermined temporary positions into the second predetermined temporary positions and being moved from the inclined positions into the upright positions when the side panels are engaged by the position holding means for thereby moving the side panels into respective working positions ready to be welded to the floor panel in the working position thereof, and welding means for automatically welding the side panels to the floor panel when the side panels and the floor panel are held in the respective working positions thereof. The automatic body assembling apparatus according to the present invention has thus far been assumed for being operable to assemble only the floor panel and the side panels together, such an apparatus may be modified to be capable of assembling not only the floor panel and the side panels by a cowl-and-dash-panel subassembly and/or a parcel shelf member. Thus, the apparatus according to the present invention may further comprise third conveying means for conveying a cowl-and-dash-panel subassembly into a predetermined working position ready to be welded to the side panels, the third conveying comprising a stationary horizontal member extending over a predetermined front portion of the automobile body structure to be assembled and in a direction parallel to the lateral direction of the body structure to be assembled, a crane horizontally movable along the horizontal member and including a hanger unit which is vertically movable toward and away from the horizontal member and which is operative to releasably suspend therefrom the cowl-and-dash-panel subassembly, the crane being movable between a first horizontal position ready to be loaded with the cowl-and-dash-panel subassembly and a second horizontal position over and substantially aligned with the predetermined front portion of the body structure to be assembled, the hanger unit being movable between a predetermined uppermost vertical position and a predetermined lowermost vertical position to carry the cowl-and-dash-panel subassembly in the previously mentioned predetermined position thereof, first drive means for moving the crane between the first and second horizontal positions thereof, second drive means for moving the hanger unit between the predetermined uppermost and lowermost vertical positions thereof, and welding means for automatically welding the cowl-and-dash-panel subassembly to the side panels when the cowl-and-dash-panel subassembly and the side panels are held in the respectively working positions thereof. The apparatus according to the present invention may further comprise fourth conveying means for conveying a parcel shelf member into a predetermined working position ready to be welded to the side panels, the fourth conveying means comprising a vertically movable member which is movable in vertical direction between predetermined uppermost and lowermost vertical positions, a horizontal carrying boom supported by the vertically movable member and horizontally rotatable about an axis of the vertically movable member between a first angular position ready to be loaded with the parcel shelf member and a second angular position having its leading end portion located over a predetermined rear portion of the automobile body structure to be assembled, a hanger unit which depends from the leading end portion of the carrying boom and which is vertically movable between a predetermined uppermost vertical position and a predetermined lowermost vertical position to hold the parcel shelf member in the predetermined working position thereof, first drive means for moving the vertically movable member and accordingly the carrying boom between the predetermined uppermost and lowermost vertical positions thereof, second drive means for moving the carrying boom between the first and second predetermined angular positions thereof, third drive means for moving the hanger unit between the predetermined uppermost and lowermost vertical positions thereof, and welding means for automatically welding the parcel shelf member to the side panels when the parcel shelf member and the side panels are held in the predetermined working positions respecitvely thereof.

The second conveying means forming part of the automatic body assembling apparatus of the general construction thus far described may comprise a hanger unit which is vertically movable between predetermined uppermost and lowermost vertical positions above the predetermined working position of the floor panel and which includes a pair of clamping assemblies which are operative to respectively suspend the side panels therefrom and which are movable between first positions closest to each other and second positions remotest from each other in a direction substantially parallel to the lateral direction of the automobile body structure to be assembled, first drive means for driving the hanger unit between the predetermined uppermost and lowermost vertical positions thereof, and second drive means for moving the above mentioned clamping assemblies between the predetermined first and second positions thereof, the clamping assemblies being held in the first positions thereof when the hanger unit is maintained in the predetermined uppermost vertical position thereof and being moved toward the second positions thereof as the hanger unit is downwardly moved from the predetermined uppermost vertical position toward the predetermined lowermost vertical position so that the side panels suspended from the clamping assemblies are held in the predetermined first temporary positions when the hanger unit is moved into the lowermost vertical positions thereof and the clamping assemblies are moved into the second positions thereof. On the other hand, the previously mentioned first guiding and positioning means may comprise a rocking lever which is rotatable about and axis extending substantially in parallel to the fore-and-aft direction of the automobile body to be assembled and which is formed with a guiding and positioning surface which is configured to be snugly engageable with the lower end of the associated side panel, a control arm which is pivotally mounted on the rocking lever and which is movable into an angular position engageable with the lower end of the side panel for guiding and positioning the lower end of the side panel into close contact with the guiding and positioning surface of the rocking lever when the side panel is moved into the first temporary position thereof by the second conveying means, and drive means for moving the control arm into and out of the above mentioned angular position engageable with the lower end of the side panel. The manipulating means also forming part of the automatic body assembling apparatus according to the present invention may comprise an elongate support member which is movable between first and second predetermined longitudinal positions which are respectively in correspondence with the first and second temporary positions of the associated side panel, first drive means for moving the support member between the first and second longitudinal positions thereof, a pair of manipulating arms which are pivotally mounted on the support member and which is movable into operative positions engageable with the previously mentioned predetermined portion of the associated side panel in the first and second temporary positions thereof, and second drive means movable with the support member for moving the manipulating arms into and out of the operative positions thereof. The second guiding and positioning means also forming part of the apparatus according to the present invention may comprise at least one guiding and positioning member which is formed with a guiding surface engageable with the predetermined portion of the associated side panel when the side panel is moved into the first temporary position thereof and a positioning surface which merges out of the guiding surface and which is so arranged as to hold the side panel in the previously mentioned predetermined fore-and-aft position when the previously mentioned predetermined portion of the side panel is snugly received on the positioning surface.

In accordance with the present invention, there is further provided a method of automatically assembling an automobile body structure comprising the steps of conveying a floor panel into a predetermined substantially horizontal working position, conveying in a suspended condition a pair of side panels downwardly into first predetermined temporary positions, the side panels in the first predetermined temporary positions being in spaced parallel relationship to each other and extending substantially in parallel to the fore-and-aft direction of the automobile body structure to be assembled, moving the respective lower ends of the side panels in longitudinal direction into predetermined lateral positions, moving the side panels in longitudinal directions into predetermined fore-and-aft positions, tilting the side panels away from each other about the respective lower ends of the side panels into second predetermined temporary positions, further moving the side panels into respective predetermined working positions ready to be welded to the floor panel in the working position thereof, and welding the side panels to the floor panel into a unitary structure. The side panels are preferably so conveyed into the first predetermined temporary positions in such a manner that the side panels are initially held in poistions horizontally close to each other and are gradually moved toward positions spaced wider apart from each other as the side panels are downwardly moved toward the first temporary positions thereof.

The features and advantages of the apparatus and method according to the present invention will become more apparent from the accompanying drawings, in which like reference numerals and characters designate corresponding structures, units, members and portions throughout the drawing figures and in which:

FIG. 7b is a front end view of the manipulating means illustrated in FIG. 7a;

FIG. 14 is a side elevational view which shows an example of an automatic welding arrangement which may also be incorporated into the apparatus according to the present invention;

FIG. 15b is a side elevational view of the welding gun assembly illustrated in FIG. 15a;

FIG. 16b is a side elevational view of the first welding gun assembly illustrated in FIG. 16a;

FIG. 17b is a side elevational view of the welding gun assembly illustrated in FIG. 17a.

Figure 1:
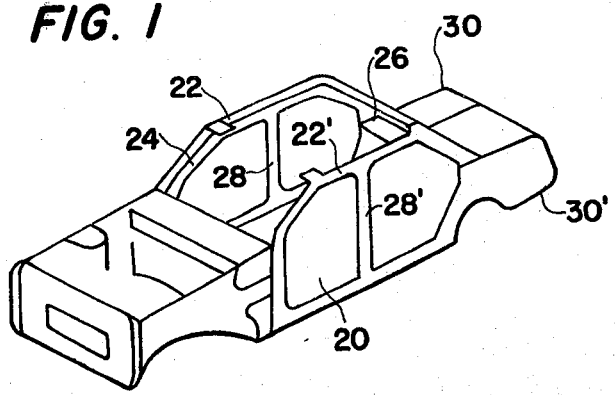
FIG. 1 is a schematic perspective view which shows an example of an automobile body structure to be assembled by the apparatus and method according to the present invention.

Before entering into description referring to the drawings, it may be mentioned that, while the apparatus and method according to the present invention may be useful for the assembling of only the floor panel and the side panels, the embodiment of the apparatus according to the present invention will be described as being operative to assemble not only the floor panel and the side panels but the cowl-and-dash-panel subassembly and the parcel shelf member.

Referring to the drawings, first to FIG. 1, the vehicle body structure to be assembled by the method and apparatus according to the present invention is shown to be composed of a floor panel 20 to form a major part of the understructure of the vehicle body, a pair of side panels 22 and 22' to be welded along their lower ends to the longitudinal edges of the floor panel 20 as indicated by markings x, a cowl-and-dash-panel subassembly 24 to be positioned in front of the occupants' compartment, and a parcel shelf member 26 to be positioned at the rear of the occupants' compartment. The side panels 22 and 22' are shown to include vertically extending center pillar portions 28 and 28' and rear fender portions 30 and 30' located at the rear ends of the side panels.

While the method and apparatus according to the present invention will be herein described as being applied to the assemblage of all the members and subassembly illustrated in FIG. 1, it should be borne in mind that such is merely for the purpose of illustration and that the method and apparatus according to the present invention may be applied for the assemblage of only the floor panel 20 and the side panels 22 and 22'.

Figure 2:
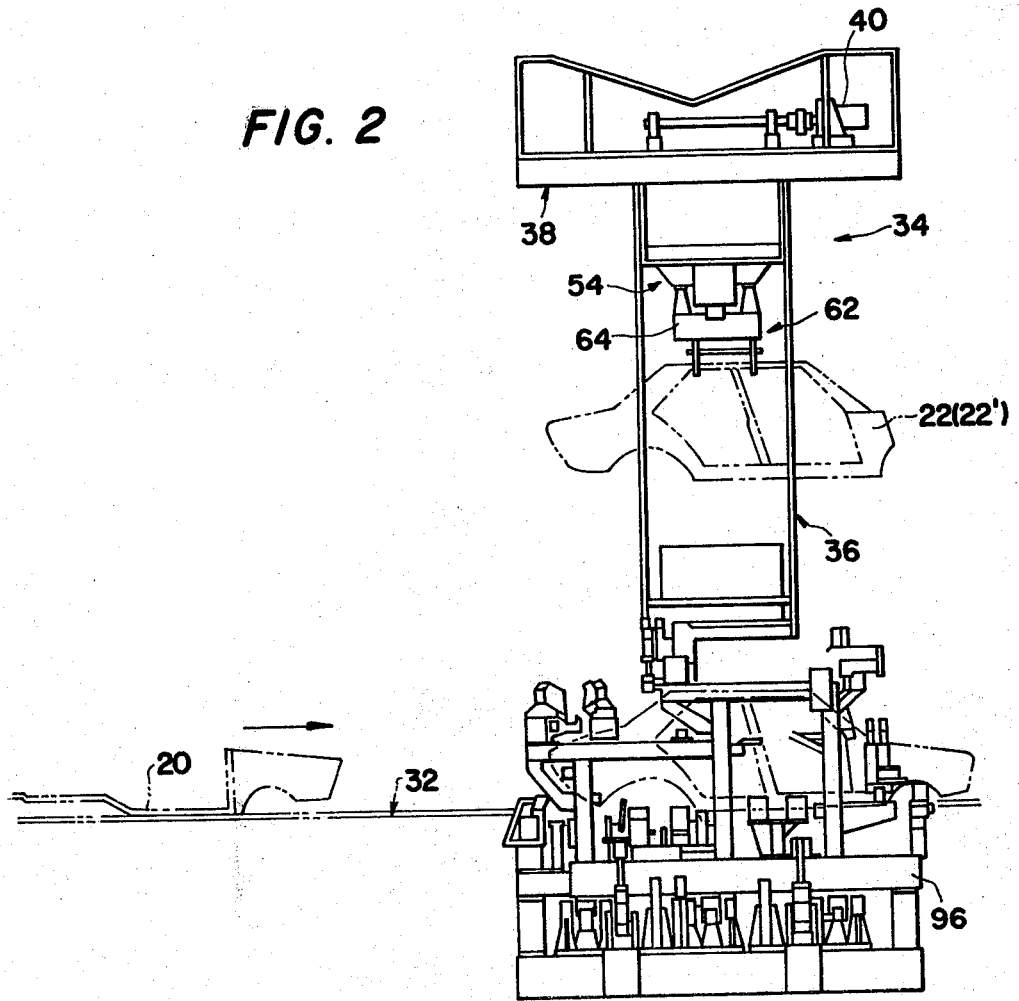
FIG. 2 is a schematic side elevational view showing an overall construction of the automatic body assembling apparatus according to the present invention.
Figure 3:
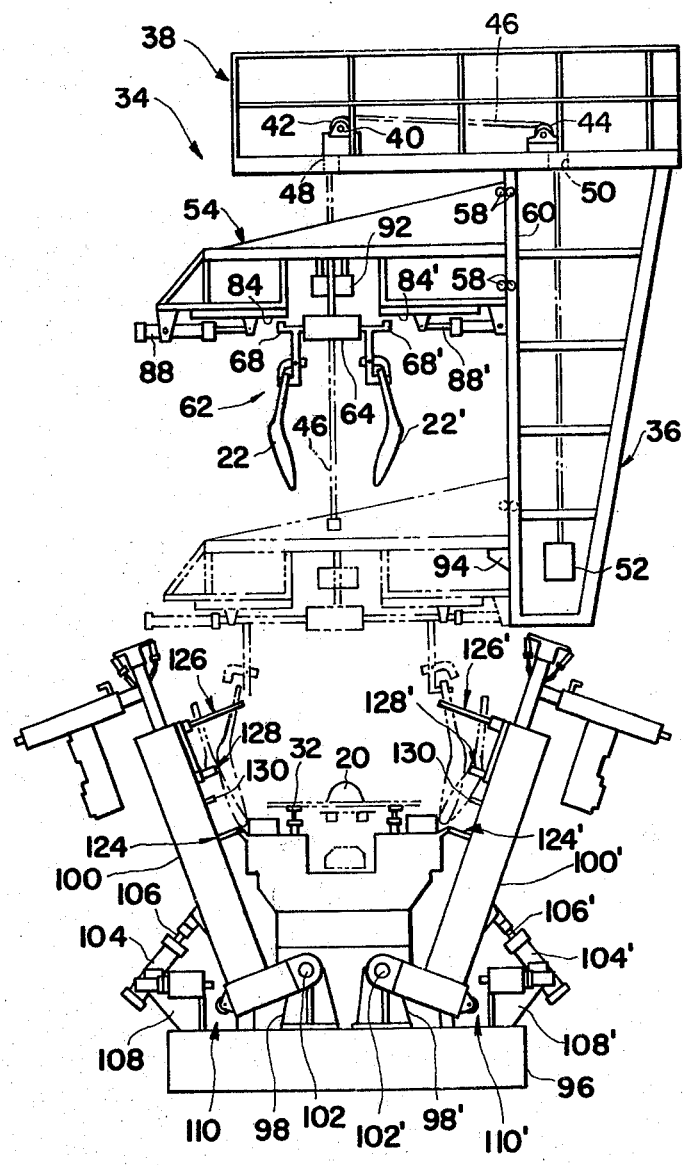
FIG. 3 is a schematic front end view showing an arrangement including jig means to move the side panels into the working position ready to be welded and means to convey the side panels to the jig means.
Figure 4:
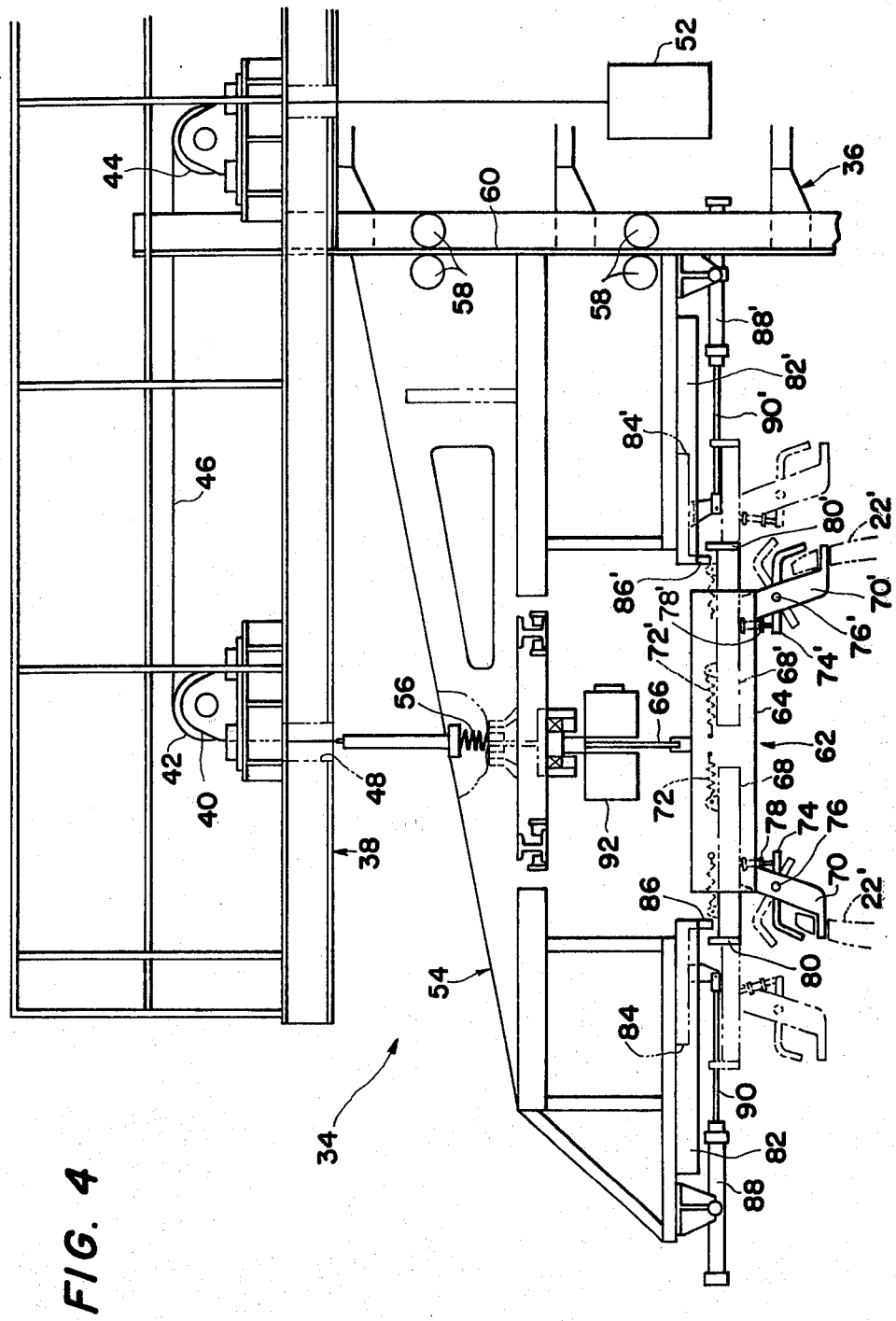
FIG. 4 is a front end view which shows, to an enlarged scale, the above mentioned means to convey the side panels to the jig means.

Turning to FIGS. 2 to 4, the automatic body assembling apparatus embodying the present invention comprises first conveying means 32 adapted to convey a floor panel 20 in a horizontal direction to a predetermined working position and second conveying means 34 adapted to convey a pair of side panels 22 and 22' in vertical directions to predetermined working positions over the floor panel 20 moved to the working position thereof. The first conveying means 32 may use any known powered conveyor arrangement such as a belt or roller conveyor, although such an arrangement is not herein shown in detail. The second conveying means 34 comprise a stationary vertical column 36 and a horizontal beam 38 which is fixedly cantilevered to the top of the column 36 and which extends over the previously mentioned working position of the floor panel 20. The horizontal beam 38 carries thereon a chain drive arrangement which comprises a reversible motor 40, a first sprocket wheel 42 having a shaft coupled to the output shaft of the motor 40, a second sprocket wheel 44 positioned in alignment with the first sprocket wheel 42, and a roller chain 46 engaging the two sprocket wheels 42 and 44. The beam 38 is formed with first and second openings 48 and 50 which are located adjacent to the first and second sprocket wheels 42 and 44, respectively, so that the roller chain 46 withdrawing from the sprocket wheels 42 and 44 depend downwardly from the sprocket wheels through these openings 48 and 50.

The roller chain 46 is anchored at one end to a balancing weight 52 and at the other end to a hanging boom 54 through a shock-absorbing spring 56. The hanging boom 54 is thus suspended by the roller chain 46 over the working position of the floor panel 20 and is vertically movably supported by the column 36 through guide rollers 58 which are in rolling engagement with a vertically extending rail member 60 forming part of the column 36 as will be best seen in FIG. 4. The hanging boom 54 is thus vertically moved along the rail member 60 of the column 36 when the roller chain 46 is driven to move in either direction by the reversible motor 40.

The hanging boom 54 has fixedly carried thereon a hanger unit 62 which comprises a horizontal hook support member 64 connected to the underside of the hanging boom 54 through a rigid connecting member 66 and located above an intermediate position between the previously mentioned working positions of the side panels 22 and 22'. The hook support member 64 has guide rails (not seen in the drawings) which extend in line with each other in a direction transverse to the longitudinal directions of the side panels 22 and 22' in the working positions thereof or, in other words, to the fore-and-aft direction of the floor panel 20 in the working position thereof as will be gathered from the illustrations of FIGS. 3 and 4. The hook support member 64 carries a pair of elongate sliding members 68 and 68' which are in sliding engagement with the above mentioned guid rails. These sliding members 68 and 68' are securely connected to or integral with hook members 70 and 70', respectively, which are adapted to receive thereon horizontally extending upper end portions of the side panels 22 and 22' so that the side panels are suspended therefrom by their own weights as will be seen in FIG. 3. The hook members 70 and 70' are thus movable toward and away from each other as the sliding members 68 and 68' on the hook support member 64 are moved along the guide rails of the hook support member 64. The sliding members 68 and 68' are connected to preload springs 72 and 72', respectively, which urge the sliding members 68 and 68' to move toward each other.

Clamp members 74 and 74' are pivotally mounted on the hook members 70 and 70' through pivotal pins 76 and 76', respectively, and are rotatable about the pivotal pins 76 and 76' between first angular positions providing wide open spaces between the clamp members 74 and 74' and the associated hook members 70 and 70' as indicated by phantom lines in FIG. 4 and second angular positions close to the associated hook members 70 and 70' as indicated by full lines in FIG. 4. The clamp members 74 and 74' are driven to move between the first and second angular positions by means of fluid-operated cylinders 78 and 78', respectively, which are connected each at one end to the hook support member 64 and at the other to the associated clamp member.

The sliding members 68 and 68' carrying the hook members 70 and 70' and the clamp members 74 and 74', respectively, have axially outer end portions projecting from the longitudinal ends of the hook support member 64 and are formed at their axially outer ends projections 80 and 80' which are directed perpendicularly to the axes of the sliding members 68 and 68' or, in the arrangement shown in FIG. 4, upwardly. A pair of elongate guide rails 82 and 82' are fixedly secured to the hanging boom 54. The guid rails 82 and 82' extend in parallel to extensions of the axes of the sliding members 68 and 68', respectively, and carry thereon sliding plates 84 and 84' which are movable back and forth along the guide rails 82 and 82'. The sliding plates 84 and 84' are formed with downward projections 86 and 86', respectively, which are engageable with the upward projections 80 and 80' of the sliding members 68 and 68', respectively. The sliding plates 84 and 84' are driven to move on the guide rails 82 and 82' by means of fluid-operated cylinders 88 and 88' each of which is connected at one end to a bracket securely mounted on the hanging boom 54 and at the other end to the associated sliding plate. When, thus, the fluid-operated cylinders 88 and 88' are so conditioned that the piston rods 90 and 90' of the cylinders are actuated to project forward, the sliding plates 84 and 84' are driven to move on the guide rails 82 and 82' toward the longitudinal ends of the hook support member 64 or toward each other so that the downward projections 86 and 86' of the sliding plates 84 and 84' are disengaged from the upward projections 80 and 80' of the sliding members 68 and 68', respectively, on the hook support member 64. The sliding members 68 and 68' are accordingly moved toward each other by the forces of the preload springs 72 and 72', respectively, so that the hook members 70 and 70' are moved to positions which are closest to each other as indicated by full lines in FIG. 4. When, conversely, the fluid-operated cylinders 88 and 88' are conditioned so that the piston rods 90 and 90' thereof are caused to retract, the sliding plates 84 and 84' are driven to move away from each other and have their downward projections 86 and 86' brought into engagement with the upward projections 80 and 80' of the sliding members 68 and 68'. The sliding members 68 and 68' are consequently moved away from each other against the opposing forces of the preload springs 72 and 72' so that the hook members 70 and 70' secured to the sliding members 68 and 68' are moved to positions remotest from each other as indicated by phantom lines in FIG. 4.

The reversible motor 40 to effect the upward and downward movement of the hanging boom 54, the fluid-operated cylinders 78 and 78' to effect the angular movement of the clamp members 74 and 74', and the fluid-operated cylinders 88 and 88' operative to move the sliding plates 84 and 84' are actuated under the control of a control unit 92 mounted on the hanging boom 54. Designated by reference numeral 94 in FIG. 3 is a stop member which is mounted on the vertical column 36 for detecting the movement of the hanging boom 54 to the predetermined lowermost position thereof. The hanging boom 54 is held in the uppermost position when the hanger unit 62 is to be loaded with the side panels 22 and 22'. When the hanging boom 54 is thus held in the uppermost position, the fluid-operated cylinders 78 and 78' carried on the hook support member 64 are initially conditioned to hold the clamp members 74 and 74' in the previously mentioned first angular positions providing wide open spaces between the clamp members 74 and 74' and the associated hook members 70 and 70'. The horizontally extending upper end portions of the side panels 22 and 22' can therefore be readily seized by the hook members 70 and 70' without being interferred by the clamp members 74 and 74'. When the side panels 22 and 22' are thus hooked by the hook members 70 and 70' and are suspended from the hanger unit 62, the fluid-operated cylinders 78 and 78' are actuated to move the clamp members 74 and 74' into the previously defined second angular positions thereof so that the side panels 22 and 22' are prevented from being dislodged from the hanger unit 62. When the side panels 22 and 22' are thus carried by the hanger unit 62, the fluid-operated cylinders 88 and 88' are held in conditions in which the piston rods 90 and 90' thereof are extended so that the downward projections 86 and 86' of the sliding plates 84 and 84' are disengaged from the upward projections 80 and 80' of the sliding members 68 and 68' on the hook support member 64. The sliding members 68 and 68' and accordingly the hook members 70 and 70' are therefore held in positions closest to each other by means of the preload springs 72 and 72', as indicated by full lines in FIG. 4. With the side panels 22 and 22' thus carried by the hanger unit 62, the reversible motor 40 is switched in under the control of the control unit 92 and drives the hanging beam 54 to lower along the rail member 60 of the vertical column 36 until the hanging beam 54 hits the stop member 94 on the column 36. As the hanging beam 54 and accordingly the hanger unit 62 are thus moved downward, the fluid-operated cylinders 88 and 88' associated with the hanger unit 62 are actuated by means of the control unit 92 so that the piston rods 90 and 90' thereof retract from the initial positions. The downward projections 86 and 86' of the sliding plates 84 and 84' are brought into engagement with the upward projections 80 and 80' of the sliding members 68 and 68', respectively, which are consequently moved on the guide rails of the hook support member 64 away from each other. When the hanging beam 54 hits the stop member 94 and is caused to cease lowering, the hook members 70 and 70' are moved into positions remotest from each other as indicated by phantom lines in FIGS. 3 and 4.

The automatic body assembling apparatus embodying the present invention further comprises jig means which are installed on a stationary base structure 96 which is positioned below the previously mentioned working positions of the floor panel 20 and the side panels 22 and 22'. The jig means are intended to move the side panels 22 and 22' into the predetermined working positions ready to be welded to the floor panel 20 moved to the working position thereof and include a pair of brackets 98 and 98' which are fixedly mounted on the top face of the base structure 96 and elongate rockable members or pillars 100 and 100' which have lower end portions rotatably connected to the brackets 98 and 98' through shafts 102 and 102', respectively. The shafts 102 and 102' are located in symmetry with respect to the overlying hanger unit 62 and extend in parallel to the fore-and-aft or longitudinal directions of the floor panel 20 and the side panels 22 and 22' to be positioned over the base structure 96 so that the rockable pillars 100 and 100' are rotatable about the shafts 102 and 102' between upright positions (see FIG. 10) on both sides of the side panels 22 and 22' suspended from the hanger unit 62 depending from the hanging boom 54 in the lowermost position and inclined positions downwardly inclined from vertical directions with their upper end portions spaced wider from each other as illustrated in FIG. 3. The rockable pillars 100 and 100' are driven to move between these positions by means of fluid-operated cylinders 104 and 104', respectively, which have piston rods 106 and 106' connected at their leading ends to the rockable pillars 100 and 100' and which are mounted on the top face of the base structure 96 through brackets 108 and 108', respectively.

Figure 5:
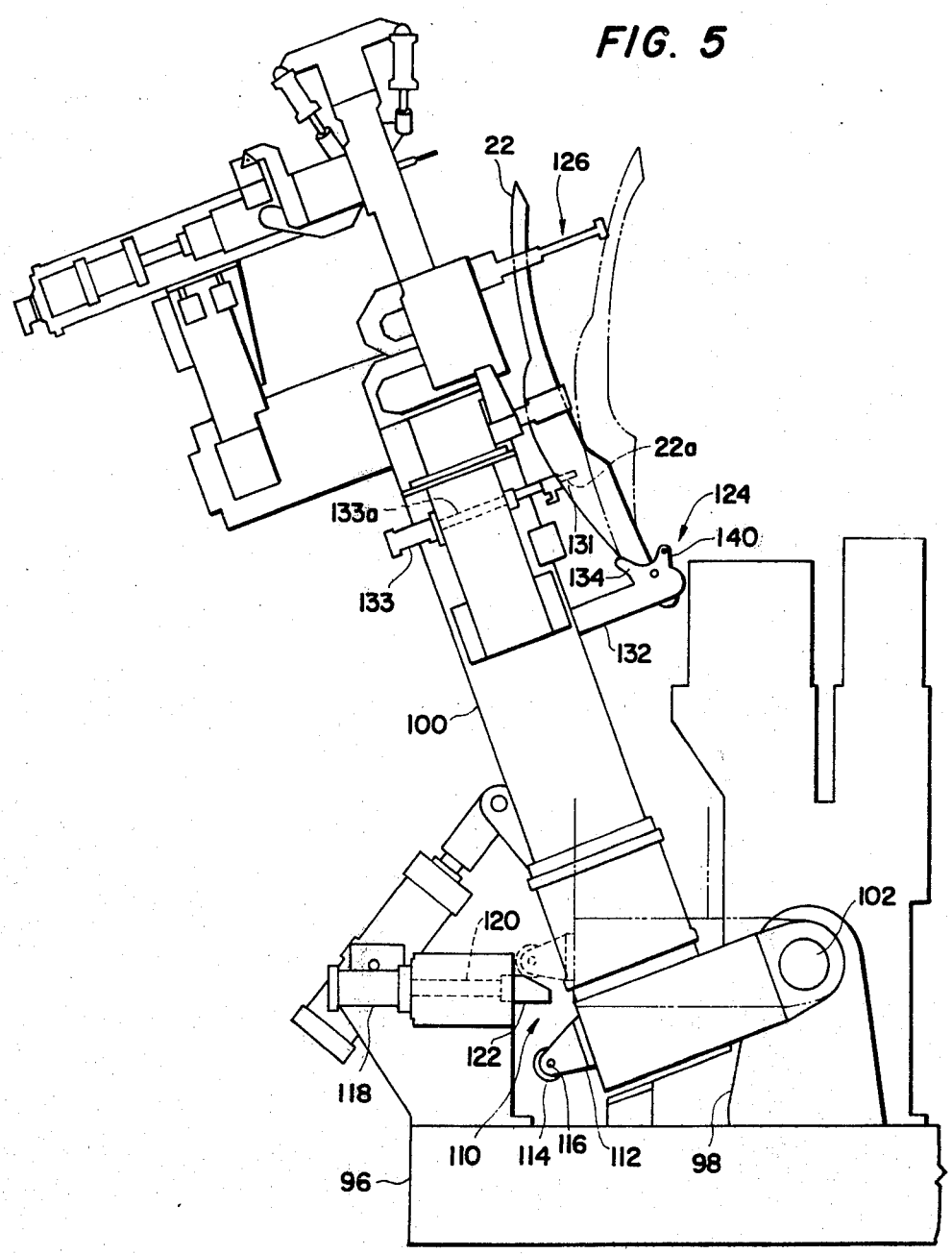
FIG. 5 is a front end view showing, to a further enlarged scale, a general construction of the jig means.

The rockable pillars 100 and 100' are, furthermore, provided with position holding means 110 and 110', respectively, as roughly illustrated in FIG. 3. The position holding means 110 and 110' are adapted to securely maintain the rockable pillars 100 and 100' in their upright positions when the rockable pillars 100 and 100' are moved from the inclined positions to the upright positions by the action of the fluid-operated cylinders 104 and 104'. The position holding means 110 and 110' associated with the rockable pillars 100 and 100', respectively, are arranged essentially similarly to each other and, therefore, the detailed arrangement of only one of them, viz., the position holding means 110 associated with the rockable pillar 100 will be described with reference to FIG. 5. Referring to FIG. 5, the position holdding means 110 includes a bracket 112 which is fixedly secured to the lower end portion of the rockable pillar 100 and which projects toward the bracket 108 on the base structure 96. A roller 114 is rotatably mounted on the bracket 112 through a shaft 116 extending in parallel to the axis of rotation of the rockable pillar 100, viz., to the shaft 102 on the bracket 98 carrying the pillar 100. In conjunction with the roller 114 thus arranged, there is further provided a fluid-operated cylinder 118 which is supported on the bracket 108. The fluid-operated cylinder 118 has a piston rod 120 carrying at its leading end a plunger 122 which is directed toward the lower end portion of the rockable pillar 100. When the fluid-operated cylinder 104 for driving the rockable pillar 100 is in a condition to hold the pillar in its inclined position as illustrated in FIG. 5, the fluid-operated cylinder 118 associated with the roller 114 is held in a condition having its piston rod 120 retracted. When, however, the fluid-operated cylinder 106 is actuated so that the rockable pillar 100 is tilted up toward the upright position and accordingly the roller 114 is moved upward (or, more exactly, turned clockwise of FIG. 5 about the shaft 102 on the bracket 98), the fluid-operated cylinder 118 is actuated and the piston rod 120 thereof projects forward so that the plunger 122 is brought into engagement with the roller 112. When the rockable pillar 100 is thus held in the upright position, the roller 112 on the pillar 100 is in pressing engagement with the upper face of the plunger 122 as indicated by phantom lines in FIG. 5 so that the pillar 100 is locked in the upright position.

As has been roughly shown in FIG. 3, the rockable pillars 100 and 100' respectively carry thereon first guiding and positioning means 124 and 124' (FIGS. 5 and 6), manipulating means 126 and 126' (FIGS. 5, 7a and 7b), second guiding and positioning means 128 and 128' (FIGS. 5, 8a and 8b) and position holding means 130 and 130' (FIG. 5). The means 124, 126, 128 and 130 on one rockable pillar 100 are arranged essentially similarly to those 124', 126', 128' and 130' on the other rockable pillar 124' as will be sketchy illustration of FIG. 3 and, for this reason, the detailed constructions and arrangements of the means 124, 126, 128 and 130 on the rockable pillar 100 will be hereinafter described with reference to FIGS. 5, 6, 7a, 7b, 8a and 8b.

Figure 6:
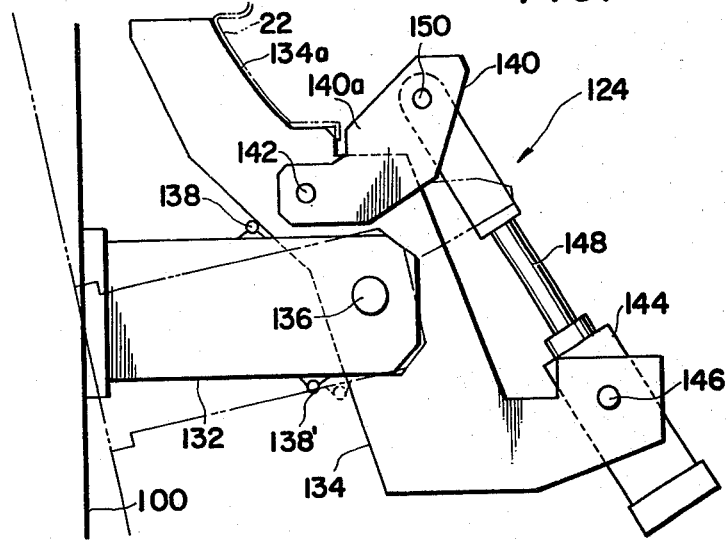
FIG. 6 is a front end view showing a preferred example of a detailed construction of first guiding and positioning means cooperative with the jig means illustrated in FIGS. 3 and 5.

The first guiding and positioning means 124 is operative to guide and move the side panel 20 into a position having its lower end located at a predetermined spacing from the inner side face of the rockable pillar 100 and at a predetermined level over the top face of the base structure 96 and includes, as illustrated in FIGS. 5 and 6, a bracket 132 which is fixedly mounted on a longitudinally intermediate portion of the rockable pillar 100 and which projects substantially perpendicularly from the inner side face of the pillar 100 toward the other rockable pillar 100'. The bracket 132 carries thereon a rocking lever 134 through a shaft 136 extending in parallel to the fore-and-aft direction of the side panel 22 to be positioned adjacent the rockable pillar 100. The rocking lever 134 is formed with a guiding and positioning surface 134a which is so configured as to snugly receive the lower end of the side panel 22 and is rotatable about the shaft 136 between a first angular position ready to receive the lower end of the side panel 22 on the guiding and positioning surface 134a as indicated by full lines in FIG. 6 and a second angular position to permit the side panel 20 to be clamped by clamping means to be described later. These first and second angular positions of the rocking lever 134 are defined by stop members 138 and 138' mounted on the bracket 132. A control arm 140 is rotatable on the rocking lever 134 through a shaft 142 extending in parallel to the shaft 136 of the rocking lever 134 and has an operating face 140a engageable with the lower end of the side panel 22 received on the guiding and positioning surface 134a of the rocking lever 134. The control arm 140 is driven to turn about the shaft 142 by means of a fluid-operated cylinder 144 which is carried on an extension of the rocking lever 134 through a pivotal pin 146 and which has a piston rod 148 connected at its leading end to the control arm 140 through a pivotal pin 150. When the fluid-operated cylinder 144 is actuated to move the piston rod 148 forward, the control arm 140 is driven to turn about the shaft 142 into a first angular position having its operating face 140 in close engagement with the lower end of the side panel 22 received on the bearing surface 134a of the rocking lever 134, as indicated in FIG. 6. When, on the contrary, the piston rod 148 of the fluid-operated cylinder 146 is caused to retract, the control arm 140 is driven to rotate about the shaft 142 into a second angular position disengaged from the side panel 22 on the rocking lever 134 as indicated by phantom line in FIG. 6. The second angular position of the control arm 140 should be so selected as to clear a path for the movement of the side panel 22 toward the side edge of the floor panel 20 to which the side panel 22 is to be welded in the working position.

Figure 7A:
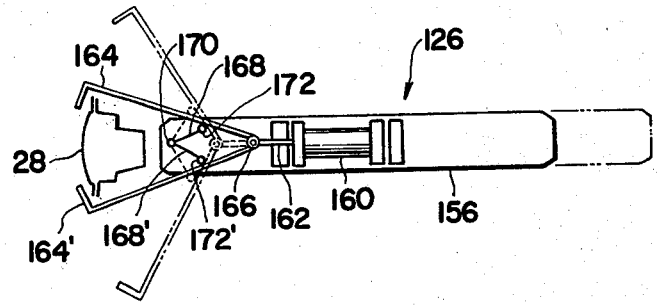
FIG. 7a is a top plan view showing a preferred example of a detailed construction of manipulating means cooperative with the jig means illustrated in FIGS. 3 and 5.
Figure 7B:
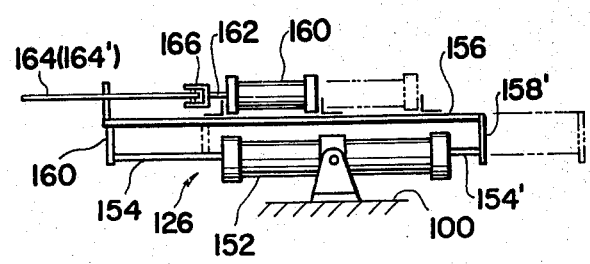

Referring to FIGS. 7a and 7b as well as FIG. 5, the manipulator means 126 is intended to suspend the side panel 22 released from the hanger unit 62 and includes a main fluid-operated cylinder 152 which is mounted on an upper end portion of the rockable pillar 100 and which is directed substantially perpendicularly to the length of the rockable pillar 100. The fluid-operated cylinder 152 has a pair of piston rods 154 and 154' extending in opposite directions. The piston rods 154 and 154' are connected to a common piston of the cylinder 152 though not seen in the drawings and are thus movable together when the piston is actuated to move in the axial direction of the cylinder 152. The piston rods 154 and 154' carry at their respective leading ends an elongate support plate 156 through connecting members 158 and 158', the support plate 156 being thus movable together with the piston rods 154 and 154', in a direction parallel to the axial direction of the cylinder 152. The support plate 156 carries thereon an auxiliary fluid-operated cylinder 160 which is also directed substantially perpendicularly to the length of the rockable pillar 100 and which has a piston rod 162. A pair of manipulating arms 164 and 164' are pivotally connected to the leading end of the piston rod 162 of the auxiliary fluid-operated cylinder 160 through a pivotal member 166. The manipulating arms 164 and 164' have leading end portions bent or curved toward each other and are rotatable about the pivotal member 166 between wide open positions providing an obtuse angle therebetween as indicated by phantom lines in FIG. 7a and closed positions providing an acute angle therebetween as indicated by full lines in FIG. 7a. When held in the closed positions indicated by the full lines in FIG. 7a, the manipulating arms 164 and 164' are capable of grasping therebetween a vertically extending upper portion such as for example the center pillar 28 of the side panel 22. The manipulating arms 164 and 164' are driven to move between the wide open positions and the closed positions by means of a link mechanism which consists of a pair of link arms 168 and 168' which are pivotally connected each at one end to the support plate 156 through a pivotal pin 170 and at the other ends to longitudinally intermediate portions of the manipulating arms 164 and 164' through pivotal pins 172 and 172', respectively. The pivotal pin 170 to which the link arms 168 and 168' are jointly connected is located intermediate between the manipulating arms 164 and 164' and in line with the pivotal member 166 carried on the piston rod 162 of the fluid-operated cylinder 160 or, in other words, in symmetry with respect to the manipulating arms 164 and 164' as seen in FIG. 7a. When, thus, the auxiliary fluid-operated cylinder 160 on the support plate 156 is actuated to cause the piston rod 162 to project forward, the pivotal member 166 carried at the leading end of the piston rod 162 is moved closer to the pivotal pin 170 between the link arms 168 and 168' so that the link arms 168 and 168' are moved into angularly spaced positions and as a consequence the manipulating arms 164 and 164' are moved to the previously mentioned wide open positions providing an obtuse angle therebetween as indicated by phantom lines in FIG. 7a. When, conversely, the auxiliary fluid-operated cylinder 160 is in condition so as to cause the piston rod 162 to retract from the forwardly extended axial position, the pivotal member 166 on the piston rod 162 is moved away from the pivotal pin 170 on the support plate 156 so that the link arms 168 and 168' are cuased to turn about the pivotal pin 170 into angularly close positions whereby the manipulating arms 164 and 164' are moved into the previously mentioned closed positions providing an acute angle therebetween as indicated by full lines in FIG. 7a. Without respect to the angular positions of the manipulating arms 164 and 164' and the axial position of the piston rod 162 of the auxiliary fluid-operated cylinder 162, the cylinder 162, manipulating arms 164 and 164' and the link arms 168 and 168' are movable as a unit as in a direction perpendicular to the length of the rockable pillar 100 as the support plate 156 carrying the same is driven to move by the main fluid-operated cylinder 152.

Figure 8A:
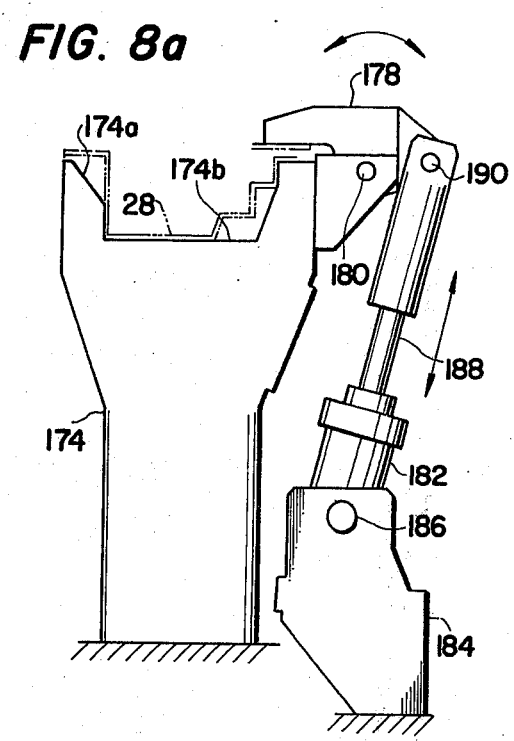
FIGS. 8a and 8b are fragmentary top plan views showing a preferred example of a detailed construction of second guiding and positioning means cooperative with the jig means illustrated in FIGS. 3 and 5.
Figure 8B:
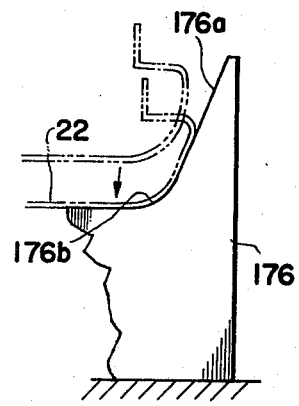

FIGS. 8a and 8b illustrate the detailed constructions of the second guiding and positioning means 128. The second guiding and positioning means 128 is intended to guide and move the side panel 22 into a predetermined fore-and-aft or longitudinal position over the top face of the base structure 96 (FIGS. 4 and 5). Referring to FIGS. 8a and 8b as well as FIG. 5, the second guiding and positioning means 128 comprises first and second guiding and positioning members 174 and 176 which project substantially perpendicularly from the inner side face of the rockable pillar 100 and which has their leading ends located to be in proximity to the upper portion of the side panel 22 in the working position. The first guiding and positioning member 174 has formed at its leading end a guiding surface 174a and a positioning surface 174b which is so configured as to be snguly engageable with an appropriate longitudinally intermediate portion such as for example the center pillar 28 of the side panel 22. A clamping lever 178 is pivotally mounted on the guiding and positioning member 174 through a shaft 180 and is thus rotatable about the shaft 180 between a first angular position which is in clamping engagement with the center pillar 28 of the side panel 22 as shown in FIG. 8a and a second angular position withdrawing from the first angular position. The clamping lever 178 is driven to move between these angular positions by means of a fluid-operated cylinder 182 which is mounted on a bracket 184 through a pivotal shaft 186 and which has a piston rod 188 pivotally connected at its leading end to the clamping lever 178 through a shaft 190. The bracket 184 is fixedly secured to the rockable pillar 100. On the other hand, the second guiding and positioning member 176 has formed at its leading end a guiding surface 176a and a positioning surface 176b merging out of the guiding surface and so configured as to be snugly engageable with a predetermined rearmost portion such as for example a fender portion of the side panel 22, as shown in FIG. 8b. The second guiding and positioning means 128 thus arranged is operative in such a manner that, if the side panel 22 happens to be located forward from a predetermined fore-and-aft position, the side panel 22 is guided by the guiding surface 174a of the first guiding and positioning member 174 and moved into the predetermined fore-and-aft position snugly engaged by the positioning surface 174b and, if the side panel 22 happens to be located rearward from the predetermined fore-and-aft position, then the side panel 22 is guided by the guiding surface 176a of the second guiding and positioning member 174 and moved into the predetermined fore-and-aft position snugly engaged by the positioning surface 176a of the second guiding and positioning member 176, as will be described in more detail.

Turning back to FIG. 5, the previously mentioned position holding means 130 comprises a positioning pin 131 projecting substantially perpendicularly from the inner side face of the rockable pillar 100. The positioning pin 131 is axially movable toward the outer face of the side panel 22 to be positioned adjacent to the rockable pillar 100 and is engageable, when forwardly extended, with the side panel 22 through an opening 22a formed in the panel 22. The positioning pin 131 is thus operative to securely hold the side panel 22 in a predetermined position relative to the rockable pillar 100 so that, when the rockable pillar 100 is moved to its upright position partly indicated by phantom lines in FIG. 5, the side panel 22 is moved into a predetermined working position ready to be welded to the floor panel 20 (FIG. 3). The positioning pin 131 is driven to axially move by means of a fluid-operated cylinder 133 which has its piston rod 131a connected at its leading end to the positioning pin 131 as indicated by broken lines in FIG. 5.

While the automatic body assembling apparatus according to the present invention may be complete with the arrangement thus far described, the apparatus embodying the invention is further provided with arrangement adapted to automatically assemble the cowl-and-dash-panel subassembly and the parcel shelf member onto the floor panel and the side panels. The cowl-and-dash-panel subassembly is conveyed to its working position by means illustrated partly in FIG. 9 and in more detail in FIGS. 10 and 11 whereas the parcel shelf member is conveyed to its working position by means illustrated partly in FIG. 9 and in more detail in FIG. 12.

Figure 9:
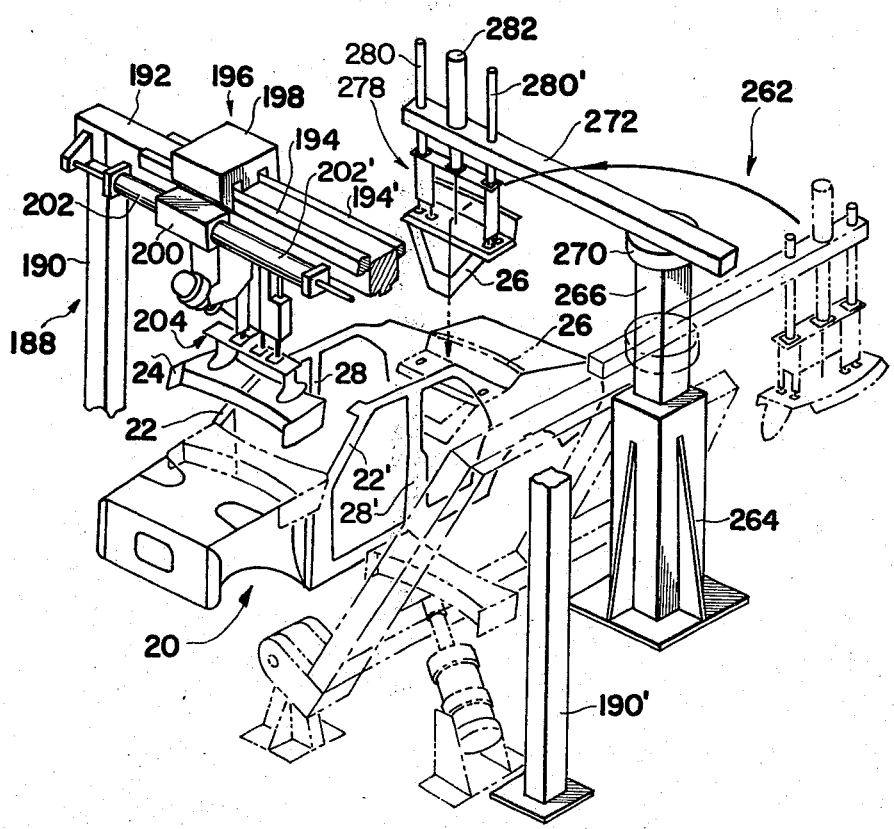
FIG. 9 is a fragmentary perspective view which schematically illustrates preferred examples of conveying means for conveying a cowl-and-dash-panel subassembly and a parcel shelf member into respective working positions.
Figure 10:
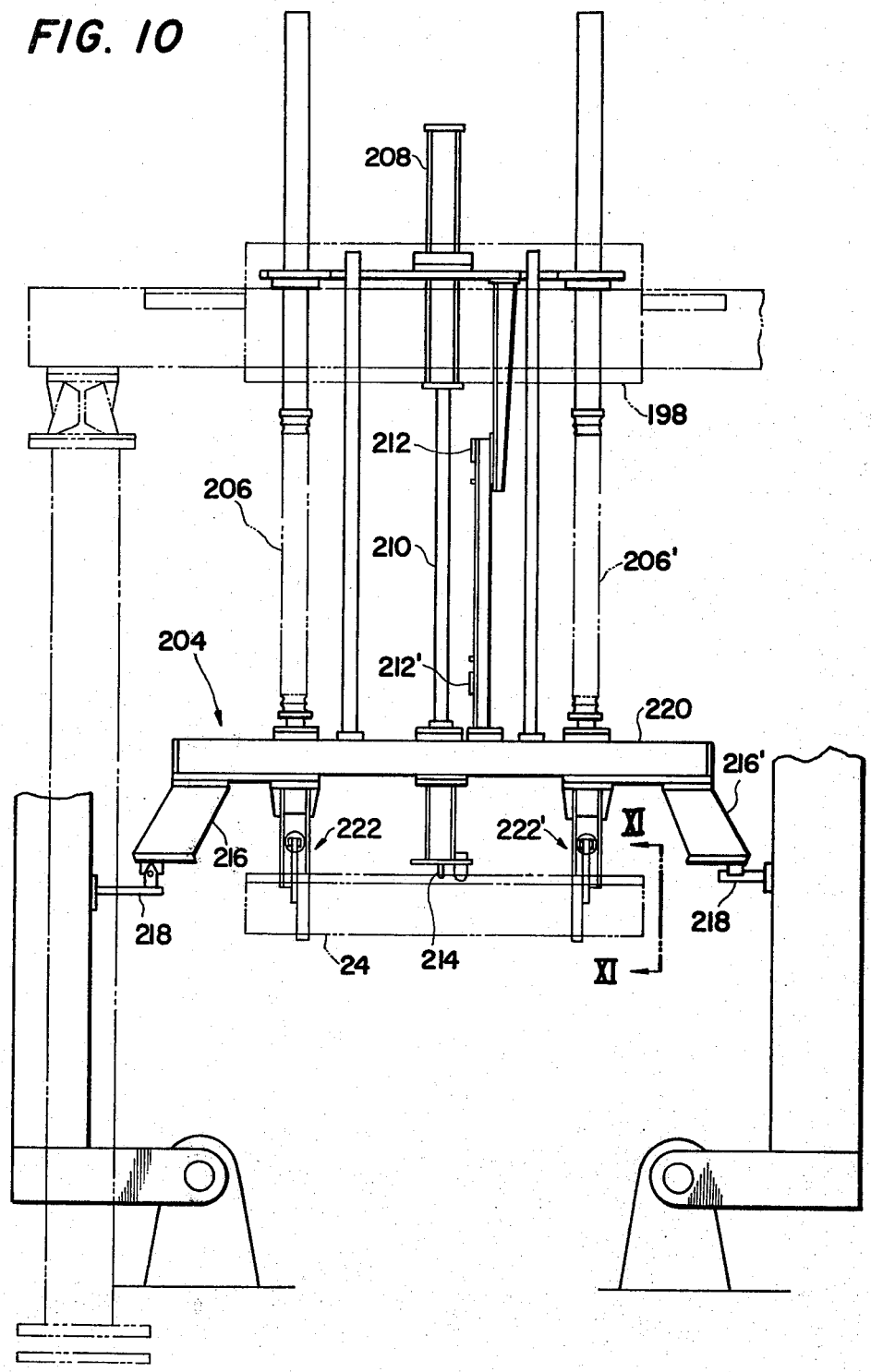
FIG. 10 is a front end view showing, to an enlarged scale, a detailed construction of the conveying means for conveying the cowl-and-dash-panel subassembly.

Referring to FIGS. 9 and 10, there is shown conveying means 188 for moving a cowl-and-dash-panel subassembly 24 into a predetermined working position over the base structure 96 (FIG. 3) relative to the floor panel 20 and the side panels 22 and 22' in the working positions thereof. The conveying means 188 comprises a gantry which consists of a pair of spaced parallel vertical posts 190 and 190' positioned on both sides of the base structure 96 and a horizontal girder 192 which is fixedly supported at both ends thereof on the tops of the vertical posts 190 and 190'. The horizontal girder 192 is provided with a pair of spaced parallel guide rail members 194 and 194' extending from one longitudinal end of the girder 192 to the other and over the above mentioned predetermined working position of the cowl-and-dash-panel subassembly 24. On the horizontal girder 192 is further mounted on overhead travelling crane 196 including a saddle 198 engaging the guide rail members 194 and 194' and horizontally movable along the guide rail members 194 and 194'. The saddle 198 is driven to move on the guide rail members 194 and 194' by means of a fluid-operated cylinder 200 which is movable with the saddle 198 in parallel to the guide rail members 194 and 194' and which has a pair of piston rods 202 and 202' projecting in opposed directions and fixedly connected at their respective leading ends to the longitudinal end portions of the girder 192, as will be seen from FIG. 9.

The conveying means 188 further comprises a hanger unit 204 which is suspended from the saddle 198 by means of a pair of guide rods 206 and 206' which are vertically movably supported by the saddle 198 on the horizontal girder 192 and which are fixedly secured at their lower ends to the hanger unit 200. The hanger unit 204 is driven to move between predetermined uppermost and lowermost positions by means of a fluid-operated cylinder 208 which is mounted on the saddle 198 and which has a piston rod 210 connected at its lower end to the hanger unit 200. The movements of the hanger unit 198 to the uppermost and lowermost positions are detected by limit switches 212 and 212', respectively, which are held stationary relative to the horizontal girder 192 and which are so located as to be engaged by the hanger unit 200 when the hanger unit 200 is vertically moved into the uppermost and lowermost positions, respectively, thereof. The relative position of the cowl-and-dash-panel subassembly 24 is accurately determined by means of a locating pin 214 which extends downwardly from the underside of the hanger unit 204 and which is located to be engageable with the cowl-and-dash-panel subassembly 24 when the subassembly 24 suspended from the hanger unit 204 is moved to a predetermined position relative to the hanger unit 204. The relative position of the hanger unit 204 is, in turn, accurately determined by means of the engagement between the hanger unit 204 and the rockable pillars 100 and 100' on the base structure 96 through a pair of locating blocks 216 and 216' which are fixedly connected to the hanger unit 204 and which are pivotally connected to the side faces of the rockable pillars 100 and 100' through connecting members 218 and 218', respectively, as seen in FIG. 10. The hanger unit 204 comprises a unitary horizontal member 220 and a pair of clamping assemblies 222 and 222' which are horizontally spaced apart from each other and which are secured at their upper ends to the horizontal member 220, as seen in FIG. 10. The previously mentioned guide rods 206 and 206' are fixedly secured at their lower ends to the horizontal member 220. The two clamping assemblies 222 and 222' are constructed and arranged essentially similarly to each other and, therefore, the detailed construction of only one of them, viz., the clamping assembly 222, will be described with reference to FIG. 11.

Figure 11:
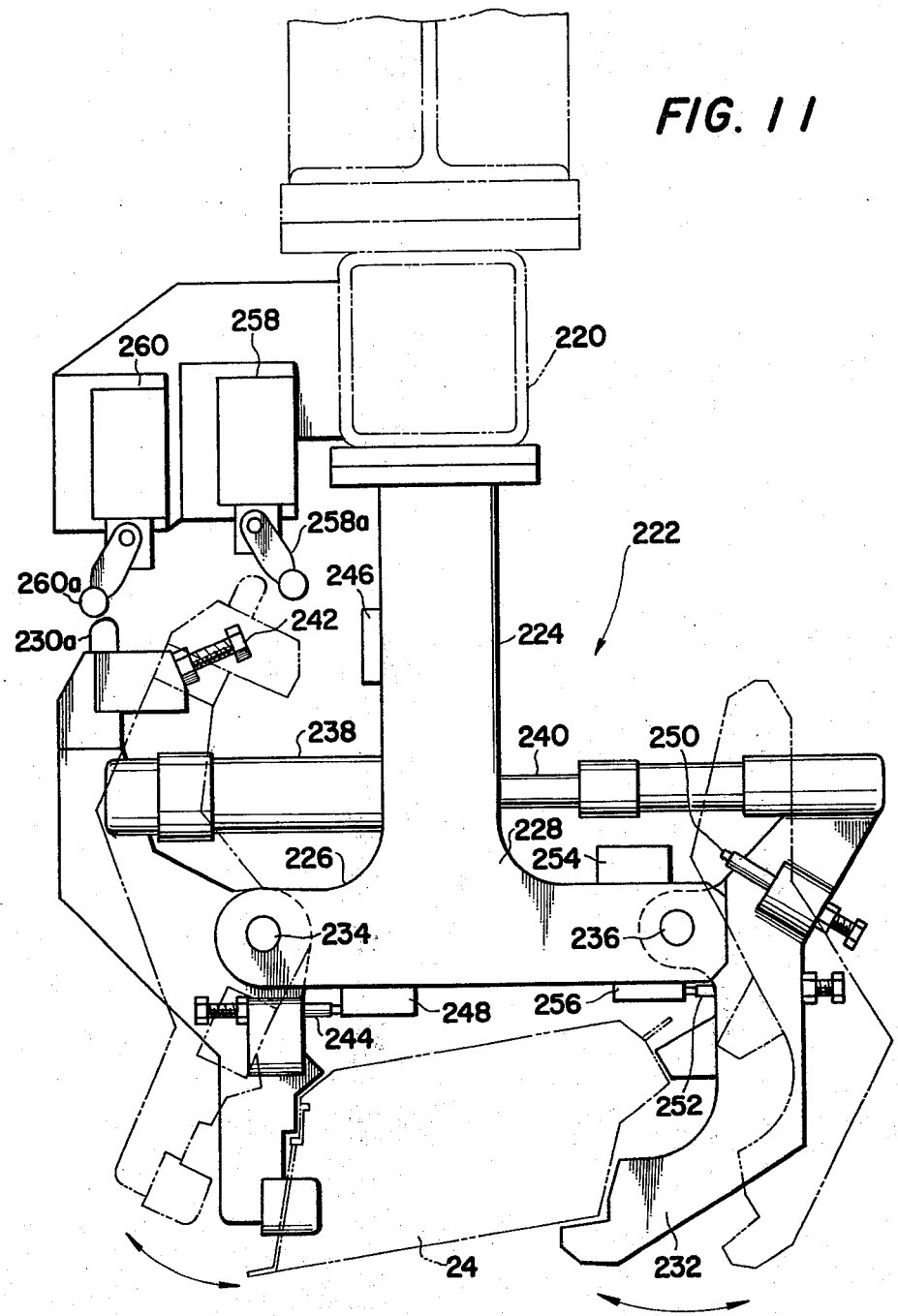
FIG. 11 is a side elevational view showing, to a further enlarged scale, a preferred example of a detailed construction of a clamping assembly forming part of the conveying means illustrated in FIG. 10.

Referring to FIG. 11, the clamping assembly 222 comprises a bracket 224 which is fixedly secured at its upper end to the above mentioned horizontal member 220 and which has formed at its lower end two arm portions 226 and 228 projecting in opposite directions and extending in substantially parallel to the fore-and-aft direction of the cowl-and-dash-panel subassembly 24. First and second clamping levers 230 and 232 are pivotally mounted on these arm portions 226 and 228 by means of shafts 234 and 236, respectively, so that the clamping levers 230 and 232 are rotatable about axes which are in parallel to the lateral direction of the cowl-and-dash-panel subassembly 24. The clamping levers 230 and 232 are rotatable about the shafts 234 and 236 between first angular positions having their lower ends spaced wide apart from each other as indicated by phantom lines in FIG. 11 and second angular positions having the lower ends located close to each other for being capable of capturing therebetween a portion of the cowl-and-dash-panel subassembly 24 as indicated by full lines in FIG. 11. The clamping levers 230 and 232 are driven to move between their respective first and second angular positions by means of a fluid-operated cylinder 238 which is secured at one end to the first clamping lever 230 and which has a piston rod 240 connected at its leading end to the second clamping lever 232 as shown. The clamping levers 230 and 232 are thus moved between the first or wide open positions and the second positions engageable with the cowl-and-dash-panel subassembly 24 as the piston rod 240 of the fluid-operated cylinder 238 is caused to project forward or retract rearward. The rotational movement of the first clamping lever 232 is limited by means including adjustable stop members 242 and 244 mounted on the clamping lever 232 and abutment pieces 246 and 248 which are fixedly secured to the bracket 224 and which are so located as to be engageable with the stop members 242 and 244, respectively. More specifically, the abutment piece 246 is secured to an upper vertical portion of the bracket 224 and the associated stop member 242 is brought into abutting engagement with the abutment piece 246 when the first clamping lever 230 is turned about the shaft 234 toward its first angular position. The combination of the stop member 242 and the abutment piece 246 is thus operative to define the first angular position of the first clamping lever 230. The abutment piece 248 is, on the other hand, secured to the arm portion 226 of the bracket 224 so that the stop member 244 associated therewith is brought into abuting engagement with the abutment piece 248 when the first clamping lever 230 is turned about the shaft 234 toward its second angular position. The combination of the stop member 244 and the abutment piece 248 is thus adapted to define the second angular position of the first clamping lever 230. Likewise, the rotational movement of the second clamping lever 232 is limited by means including adjustable stop members 250 and 252 mounted on the second clamping lever 232 and abutment pieces 254 and 256 which are fixedly secured to upper and lower faces, respectively, of the arm portion 228 of the bracket 224 and which are so located as to be engageable with the stop members 250 and 252, respectively. When the second clamping lever 232 is rotated about the shaft 236 toward its first angular position, the stop member 250 on the clamping lever 232 is brought into the associated abutment piece 254, thereby defining the first angular position of the second clamping lever 232. When the second clamping lever 232 is conversely turned about the shaft 236 toward the second angular position thereof, then the stop member 252 is brought into abutting engagement with the associated abutment piece 256 and defines the second angular position of the second clamping lever 232. Thus, the clamping assembly 222 has loading and unloading conditions which correspond to the first and second angular positions, respectively, of the clamping levers 230 and 232. The loading and unloading conditions of the clamping assembly 222 are detected by means of first and second limit switches 258 and 260, respectively, which are carried by the horizontal member 220 forming part of the clamping assembly 222. The first and second limit switches 258 and 260 have actuating elements 258a and 260a, respectively, which are engageable with a projection 230a of the first clamping lever 230. The actuating elements 258a and 260a of the limit switches 258 and 260 are so located that the actuating element 258a of the first limit switch 258 is engaged by the projection 230a of the first clamping lever 230 when the clamping lever 230 is moved to the first angular position thereof and the actuating element 260a of the second limit switch 260 is engaged by the projection 230a of the clamping lever 230 when the clamping lever 230 is moved to the second angular position thereof as indicated by full lines in FIG. 11. The first limit switch 258 is thus actuated when the clamping assembly 222 is brought into the unloading condition whereas the second limit switch 260 is actuated when the clamping assembly 222 is brought into the loading condition in which the first and second clamping levers 230 and 232 are in the wide open positions.

Figure 12:
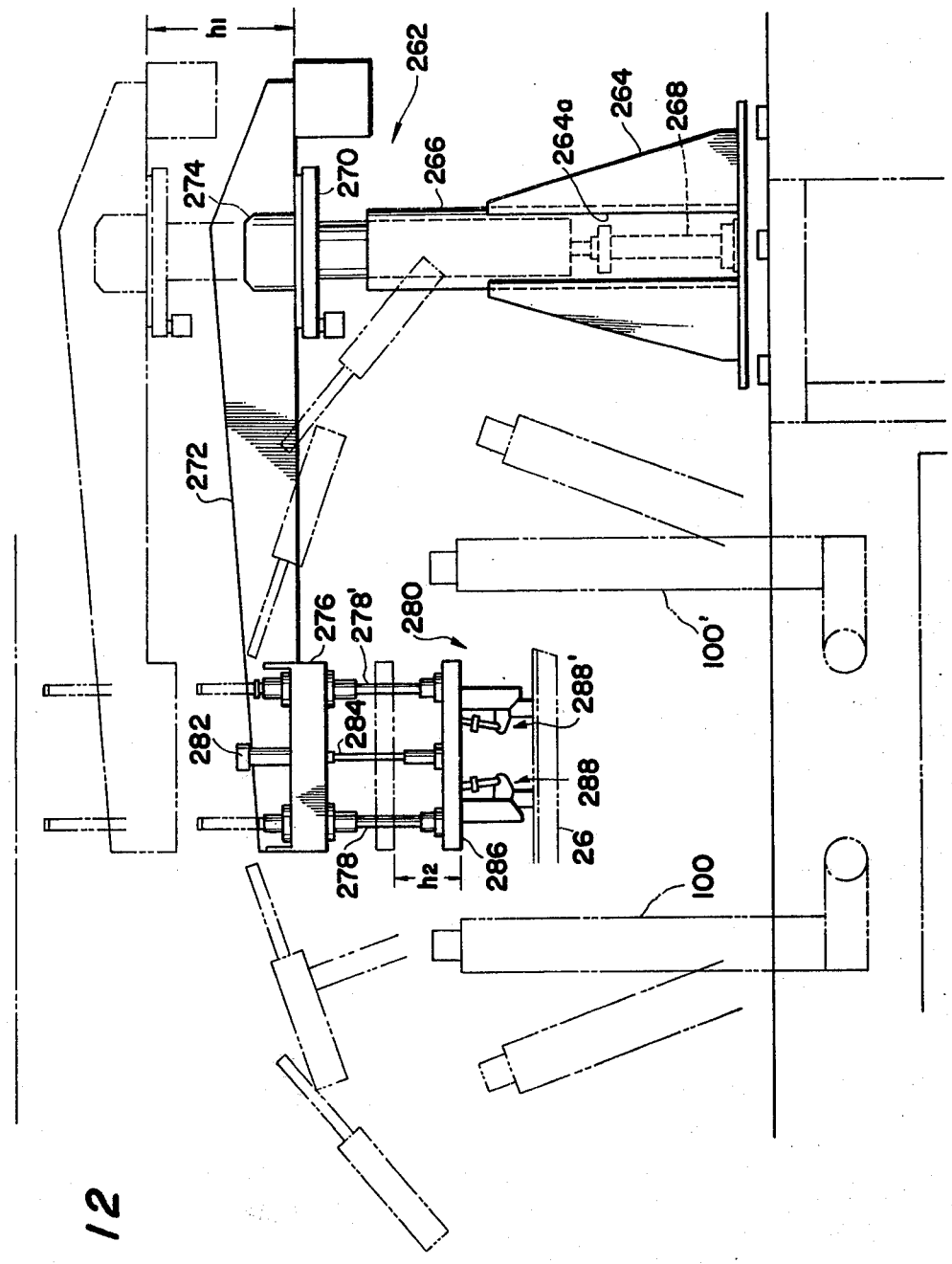
FIG. 12 is a front end view showing, to an enlarged scale, a detailed construction of the conveying means for conveying the parcle shelf member.

FIG. 12 illustrates the detailed construction of the arrangement for conveying the parcel shelf member into the predetermined working position thereof. Referring to FIGS. 9 and 12, the parcel shelf member 26 to form part of the automobile body is conveyed in a path indicated by an arrow by means which comprises a slewing lift mechanism which is generally designated by reference numeral 262. The slewing lift mechanism 262 comprises a stationary vertical column 264 which is formed with a vertical bore 264a. A movable post 266 is vertically movably received in the bore 264a and is moved upwardly and downwardly by means of a fluid-operated cylinder 268 which is positioned at the bottom of the bore 264a. The movable post 266 has its upper portion projecting out of the upper end of the bored column 264 and has fixedly carried on its top a disc member 270. A horizontal carrying boom 272 is rotatably cantilevered to the disc member 268. The carrying boom 272 is driven to rotate about an axis in line with the axis of the movable post 266 by suitable drive means which may comprise, for example, a hydraulic motor 274 mounted on the disc member 270. The hydraulic motor 274 is, in this instance, assumed to be operative to drive the carrying boom 272 through an angle of about 90 degrees between the positions which are indicated by phantom and full lines in FIG. 9. The fluid-operated cylinder 268 positioned at the bottom of the bore 264a in the vertical column 264 is, on the other hand, herein assumed to be operative to drive the movable post 266 to vertically move through a distance indicated by $h_1$, the uppermost and lowermost vertical positions of the movable post 266 being indicated by phantom and full lines, respectively, in FIG. 12.

The carrying boom 272 has fixedly secured to its leading end portion a supporting block 276. A vertically movable hanger unit 278 depends from the supporting block 276 through a pair of guide rods 278 and 278' which are vertically movably supported by the supporting block 276 and which suspend at their lower ends a hanger unit 280. The hanger unit 280 is thus vertically movable toward and away from the supporting block 276 on the carrying boom 272 along the guide rods 278 and 278' through a distance which is indicated by $h_2$ in FIG. 12. The hanger unit 280 is driven to move the distance $h_2$ by means of a fluid-operated cylinder 282 which is supported by the supporting block 276 and which has a piston rod 284 projecting downwardly and securely connected at its leading end to the hanger unit 280. The hanger unit 280 consists of a horizontal member 286 supported by the above mentioned guide rods 278 and 278" and connected to the leading end of the piston rod 284 of the fluid-operated cylinder 282 and a pair of clamping assemblies 288 and 288' depending from the underside of the horizontal member 286. Though not illustrated in detail, the clamping assemblies 288 and 288' are so constructed and arranged as to have loading and unloading positions or, more specifically, first positions inoperable to clamp the parcel shelf member 26 and second positions operable to clamp the parcel shelf member 26. Each of the clamping assemblies 288 and 288' may thus be constructed essentially similarly to the clamping assembly 222 of the conveying means for the cowl-and-dash-panel subassembly 24 as previously described with reference to FIG. 11.

The slewing lift mechanism 262 is loaded with the parcel shelf member 26 in a condition indicated by phantom lines in FIG. 9. When the slewing lift mechanism 262 is held in the condition shown by the phantom lines in FIG. 9, the movable post 266 is maintained in its lowermost position indicated by the full lines in FIG. 12 by means of the fluid-operated cylinder 268 positioned at the bottom of the vertical bore 264a in the column 264 and, at the same time, the carrying boom 272 is maintained in an angular position approximately 90° spaced apart from over the predetermined working position of the parcel shelf member 26, viz., from over the rearmost portion of an automobile body into which the parcel shelf member 26 is to be incorporated. When the parcel shelf member 26 is clamped by the clamping assemblies 288 and 288' of the hanger unit 280, the fluid-operated cylinder 268 is actuated to raise the movable post 266 through the distance indicated by $h_1$ in FIG. 12 so that the carrying boom 272 is upwardly moved from the lowermost position shown by the full lines to the uppermost position shown by the phantom lines in FIG. 12. When the movable post 266 and the carrying boom 272 are thus moved to their uppermost positions, then the hydraulic motor 274 on the disc member 270 at the top of the movable post 266 is actuated so that the carrying boom 272 suspending from the supporting block 276 is driven to rotate about the axis of the movable post 266. When the carrying boom 272 is turned through about 90° about the axis of the movable post 266 and reaches an angular position having the hanger unit 280 suspended over the predetermined working position of the parcel shelf member 26, the hydraulic motor 274 is stopped and accordingly the carrying boom 272 is held in the particular angular position. The fluid-operated cylinder 282 carried by the supporting block 276 on the carrying boom 272 is now actuated to drive the hanger unit to move downwardly through the distance indicated by $h_2$ in FIG. 12. When the hanger unit 280 thus reaches the lowermost position, the parcel shelf member 26 is held in its working position ready to be welded to the side panels 22 and 22'.

Figure 13:
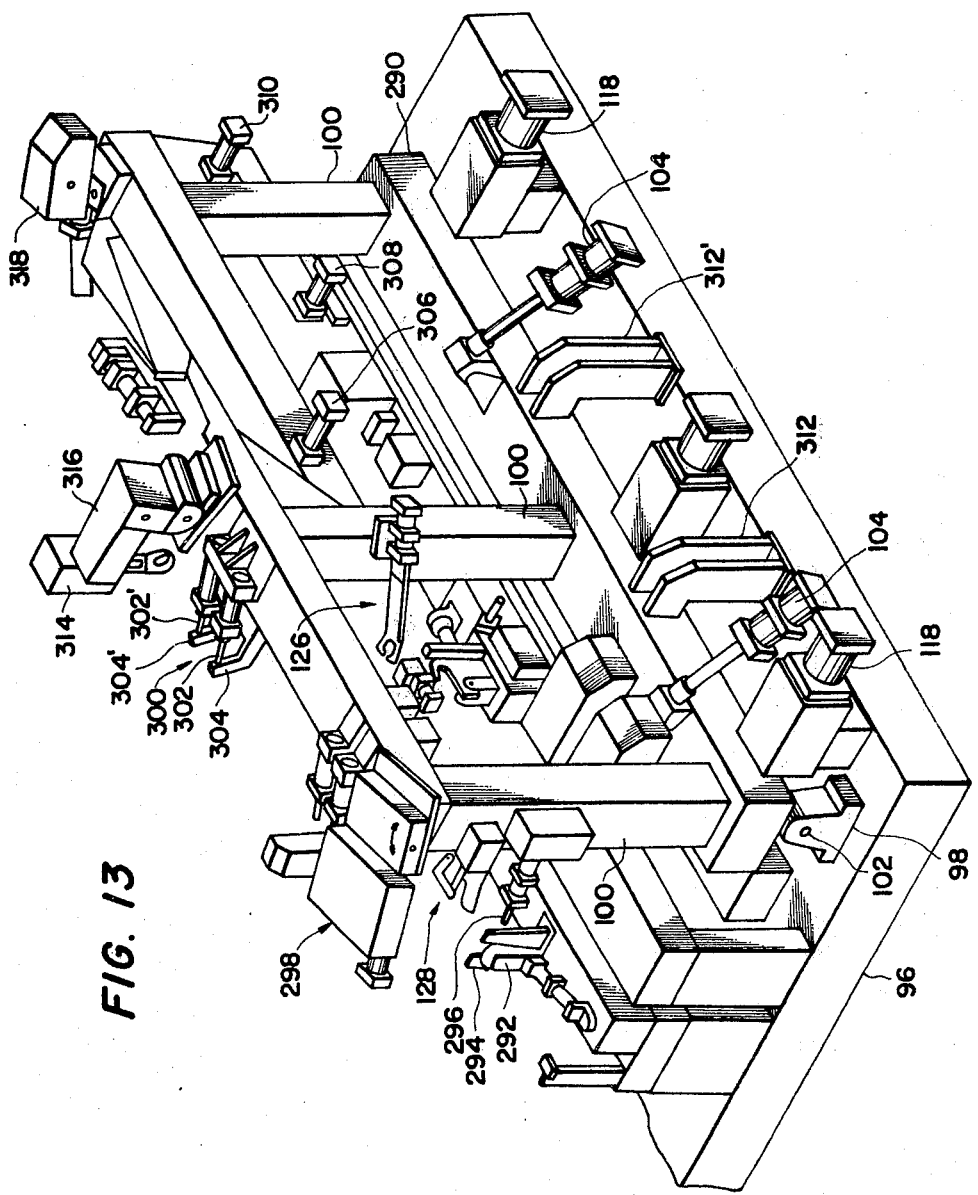
FIG. 13 is a schematic perspective view which shows an example of a positioning and clamping arrangement which may be incorporated into the apparatus according to the present invention.

FIG. 13 illustrates an example of a locating and clamping arrangement which may be incorporated into the automatic body assembly apparatus embodying the present invention. In the arrangement herein shown, it is assumed that the previously mentioned jig means installed on the base structure 96 include a set of three rockable pillars 100 and, though not shown, another set of three rockable pillars which are respectively associated with the rockable pillars 100. The rockable pillars 100 are shown to be mounted on a common horizontal member 290 extending in a fore-and-aft direction of the automotive body to be assembled and pivotally mounted on the brackets 98 (only one of which is seen in FIG. 13) so that the three rockable pillars 100 and the horizontal member 290 are bodily rotatable about the shafts 102 through which the horizontal member 290 is mounted on the bracket 98. Only one longitudinal half of the locating and clamping arrangement associated with the set of rockable pillars 100 is thus illustrated in FIG. 13. The other longitudinal half of the locating and clamping arrangement is, though not herein shown, essentially similar to the shown half.

Referring to FIG. 13, the locating and clamping arrangement of the automatic body assembling apparatus embodying the present invention includes a clamping member 292 which is adapted to move through an opening in a front portion of the floor panel (not shown in FIG. 13) and tightly capture the particular portion of the floor panel. In the vicinity of the clamping member 292 is provided a locating member 294 for receiving thereon the front portion of the floor panel and holding the particular portion of the floor panel in a predetermined position relative to the previously described jig means. A locating pin 296 projects from the inner side face of the rockable pillar 100 positioned at the foremost end of the jig means. The locating pin 296 is engageable with a predetermined portion of the cowl-and-dash-panel subassembly (not shown in FIG. 13) and is adapted to position the cowl-and-dash-panel subassembly into a predetermined working position in which the cowl-and-dash-panel subassembly is to be welded to the side panels. Over the rockable pillar 100 located at the foremost end of the jig means is positioned a multiple-electrode spot welding gun assembly 298 for welding the cowl-and-dash-panel subassembly to the side panels (not shown in FIG. 13). The locating and clamping arrangement further comprises a clamping unit 300 which is positioned over the intermediate rockable pillar 100 and which is adapted to hold the side panel in the predetermined working position relative to the floor panel and the cowl-and-dash-panel subassembly to which the side panel is to be welded. The clamping unit 300 is shown to consists of a pair of locating members 302 and 302' for moving the side panel to the working position thereof and a pair of clamping members 304 and 304' which are adapted to engageable with a predetermined portion of the side panel and clamp the side panel in the working position thereof. Designated by reference numerals 306, 308 and 310 are fluid-operated cylinders for driving locating pins and by reference numerals 312 and 312' are stop members to engage the horizontal member 290 supporting the rockable pillars 100 and holding the horizontal member 290 in a position to support the rockable pillars 100 in upright positions when the pillars 100 are driven to move into the upright positions by means of the previously mentioned fluid-operated cylinders 104 (FIG. 3). Over the intermediate rockable pillar 100 is further positioned a first multiple-electrode spot welding gun assembly 314 for welding the parcel shelf member (not shown in FIG. 13) to the side panels. The welding gun assembly 314 is shown to be rotatably supported on the intermediate rockable pillar 100 by means of an arm structure 316. A second multiple-electrode welding gun assembly 318 for welding the parcel shelf member to the side panels is positioned over the rearmost rockable pillar 100.

FIG. 14 illustrates a welding arrangement which may form part of the automatic body assembling apparatus embodying the present invention. The welding arrangement includes a rotary type multiple-electrode spot welding gun assembly 320 and a reciprocating type multiple-electrode spot welding gun assembly 322. The welding gun assemblies 320 and 322 are adapted to weld the side panels (not shown in FIG. 14) to the side edges of the cowl-and-dash-panel subassembly (not shown in FIG. 14). The welding arrangement further includes rotary type multiple-electrode spot welding gun assemblies 324 and 326 which are interconnected together.

Figure 15A:
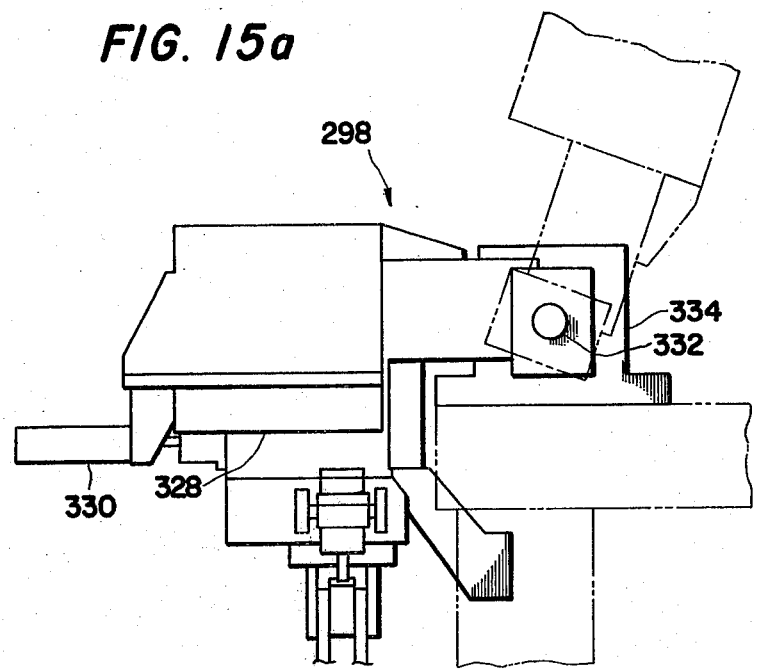
FIG. 15a is a front end view showing a detailed construction of a welding gun assembly for welding the cowl-and-dash-panel subassembly to the side panels.
Figure 15B:
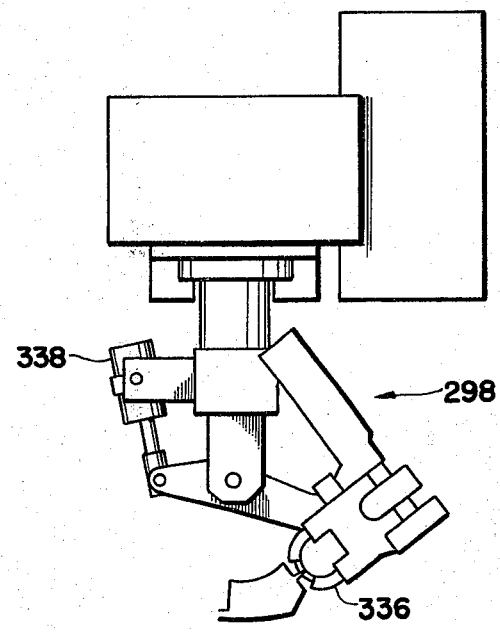

FIGS. 15a and 15b depict the detailed construction of the multiple-electrode spot welding gun assembly 298 which has been roughly illustrated in FIG. 13. The welding gun assembly 298 is adapted to automatically weld the cowl-and-dash-panel subassembly to the side panels of an automotive body and comprises, as seen in FIG. 15a, a saddle structure 328, a fluid-operated cylinder 330 for shifting purposes, a main spindle 332 which is rotatable about its axis and a hydraulic motor 334 for driving the main spindle 332 to rotate about its axis. As illustrated in FIG. 15b, the welding gun assembly 298 further comprises a multiple-electrode spot welding gun 336 and a fluid-operated cylinder 338 for driving the welding gun 336.

Figure 16A:
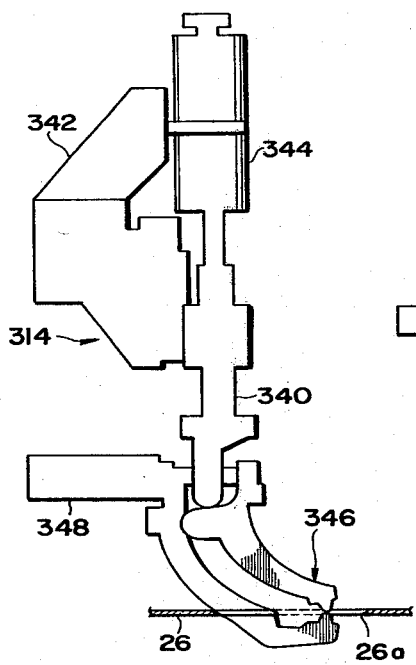
FIG. 16a is a front end view showing a detailed construction of a first welding gun assembly for welding the parcel shelf member to the side panels.
Figure 16B:
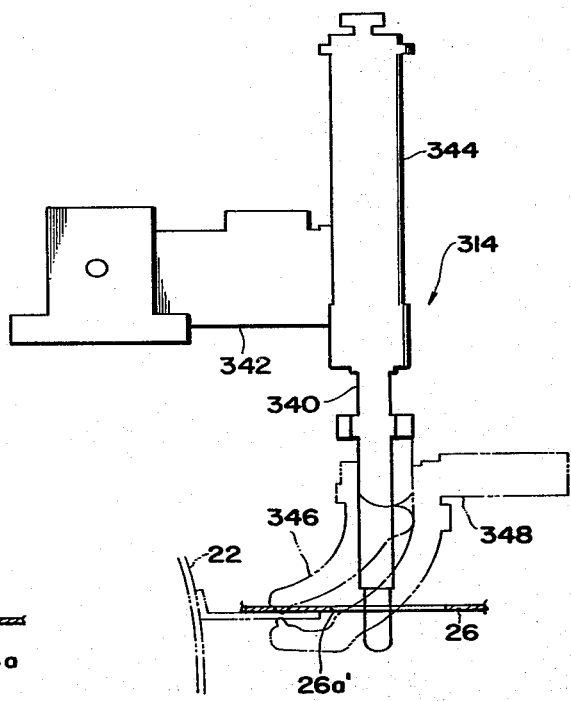

FIGS. 16a and 16b illustrate the detailed construction of the previously mentioned first multiple-electrode spot welding gun assembly 314 for welding the parcel shelf member to the side panels of an automobile body. The welding gun assembly 314 comprises a rotary spindle 340 rotatable about its axis, driving means consisting of a hydraulically operated rotor 342 and a reciprocating fluid-operated cylinder 344 for driving the main spindle 340 to rotate about its axis, a multiple-electrode spot welding gun 346 with which the main spindle 340 is in driving engagement, and a fluid-operated cylinder 348 operatively connected to the welding gun 346. The welding gun 346 is thus driven to move toward and away from an opening 26a formed in the parcel shelf member 26 by means of the fluid-operated cylinder 348 and to rotate about the axis of the spindle 340 by means of the combination of the hydraulically operated rotor 342 and the reciprocating fluid-operated cylinder 344 so that the parcel shelf member 26 is welded to the side panel 22.

Figure 17A:
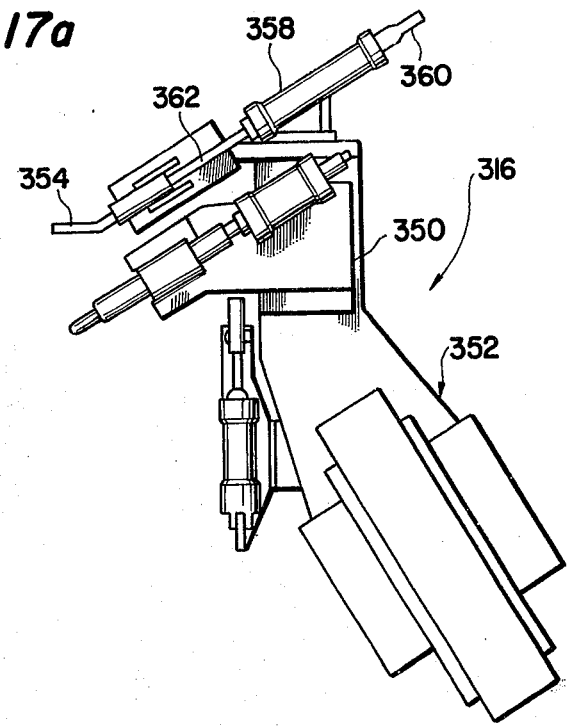
FIG. 17a is a front end view showing a detailed construction of a second welding gun assembly for welding the parcel shelf member to the side panels.
Figure 17B:
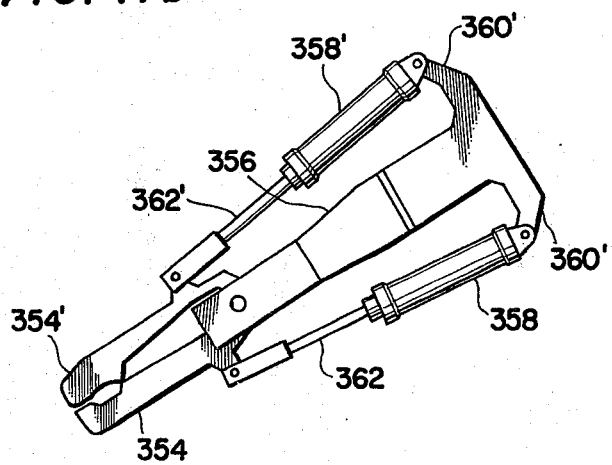

FIGS. 17a and 17b illustrate the detailed construction of the previously mentioned second multiple-electrode spot welding assembly 316 for welding the parcel shelf member 26 to the side panels 22 and 22'. Referring to FIGS. 17a and 17b, the gun-assembly 316 comprises a bracket 350 which is integral with an arm structure 352, a pair of clamping members 354 and 354' pivotally mounted at their rear end portions on a common support member 356 fixedly secured to the bracket 350, a pair of fluid-operated cylinders 358 and 358' pivotally connected each at one end to arm portions 360 and 360' of the support member 356 and having piston rods 362 and 362' pivotally connected at their leading ends to the clamping members 354 and 354', respectively. The clamping members 354 and 354' are thus adapted to be driven by the respectively associated fluid-operated cylinders 358 and 358' between open positions and closed positions indicated in FIG. 17b so that the parcel shelf member (not shown in FIGS. 17a and 17b) is clamped when the clamping members 354 and 354' are in the closed positions and is released from the clamping members 354 and 354' when the clamping members 354 and 354' are in the open positions. The bracket 350 furhter carries thereon a multiple-electrode spot welding gun 364 for welding the parcel shelf member to the side panels and a fluid-operated cylinder 366 which has a piston rod connected to the welding gun 364 for driving the welding gun 364 to axially move back and forth when the cylinder 366 is actuated. Designated by reference numeral 368 in FIG. 7a is a clamping assembly which is mounted on the arm structure 352 and which is adapted to be in clamping engagement with the rear fender portion of a sidepanel of an automobile body to be assembled.

The operation of the automatic body assembling apparatus embodying the present invention will now be described with concurrently reference to FIGS. 1 to 17b.

Before the assembling operation is started, the various units assembling constituting the assembling apparatus are held in the following conditions:

1. The hanging boom 54 suspended from the horizontal beam 38 is held in the uppermost vertical position (FIGS. 3 and 4).

2. The fluid operated-cylinders 88 and 88' are conditioned to have their piston rods 90 and 90' in forwardly extended positions so that the downward projections 86 and 86' of the sliding plates 84 and 84' are kept disengaged from the upward projections 80 and 80' of the sliding members 68 and 68' of the hanger unit 62. The sliding members 68 and 68' are therefore held in the axial positions closest to each other by the action of the preload springs 72 and 72', respectively. The hook members 70 and 70' integral with the sliding members 68 and 68', respectively, are consequently held in the positions closes to each other as seen in FIGS. 3 and 4. The fluid-operated cylinders 78 and 78' supported on the hook support member 64 are so conditioned that the clamp members 74 and 74' connected thereto are held in the previously mentioned first angular positions providing wide open spaces between each of the clamp members 74 and 74' and the associated one of the hook members 70 and 70', as indicated by phantom lines in FIG. 4. The hanger unit 62 is thus maintained in a condition ready to be loaded with the side panels 22 and 22' on the upper faces of the hook members 70 and 70', respectively.

3. The fluid-operated cylinders 104 and 104' connected to the rockable pillars 100 and 100', respectively, are held in the conditions having their piston rods 106 and 106' rearwardly retracted so that the rockable pillars 100 and 100' are maintained in the upright positions by the aid of the locking means 110 and 110' (FIGS. 3 and 5).

4. The fluid-operated cylinder 144 of the first guiding and positioning means 124 is held in the condition in which the piston rod 148 thereof is rearwardly retracted so that the control arm 140 is held in the angular position having its operating face 140a spaced apart from the operating face 134a of the rocking lever 134. The rocking lever 134 is thus ready to receive the lowermost end of the side panel 22 on its operating face 134a. (FIGS. 5 and 6)

5. The main fluid-operated cylinder 152 of the manipulating means 126 is held in the condition in which the piston rods 154 and 154' thereof are maintained in the axial positions having the elongate support plate 156 held in a position remotest from the inner side face of the rockable pillar 100. The manipulating arms 164 and 164' are accordingly held in positions remotest from the inner side face of the rockable pillar 100. Moreover, the auxiliary fluid-operated cylinder 160 on the support plate 156 is held in the condition in which the piston rod 162 thereof is forwardly extended so that the manipulating arms 164 and 164' are maintained in the previously mentioned wide open positions providing an obtuse angle therebetween as indicated by the phantom lines in FIG. 7a.

6. The fluid-operated cylinder 182 of the second guiding and positioning means 128 is held in the condition in which the piston rod 188 is rearwardly retracted so that the clamping lever 178 is turned about the shaft 180 into an angular position remotest from the positioning surface 174b of the first guiding and positioning member 174. The first and second guiding and positioning members 174 and 174' are thus ready to receive the side panel 22 at their fore-most ends. (FIGS. 8a and 8b)

7. The fluid-operated cylinder 133 is held in the condition in which the piston rod 133a thereof and accordingly the positioning pin 131 are held in the rearwardly retracted positions.

8. The fluid-operated cylinder 200 of the conveying means 188 for the cowl-and-dash-panel subassembly 24 is held in the condition having the saddle 198 of the overhead travelling crane 196 held in a position close to one end of the horizontal girder 192. The fluid-operated cylinder 208 for driving the hanger unit 204 is held in the condition having the piston rod 210 in a downwardly extended position so that the hanger unit 204 is maintained in the lowermost vertical position thereof (FIGS. 9 and 10). The fluid-operated cylinder 238 of the clamping assembly 222 (FIG. 10) is held in a condition in which the piston rod 240 thereof is rearwardly retracted so that the clamping levers 230 and 232 are held in the previously mentioned first angular positions as indicated by the phantom lines in FIG. 11.

9. The fluid-operated cylinder 268 forming part of the slewing lift mechanism 262 for conveying the parcle shelf member 26 is held in the condition maintaining the movable post 266 in the lowermost vertical position thereof so that the carrying boom 272 and the hanger unit 280 suspended thereof are also maintained in their lowermost positions. The hydraulic motor 274 for rotating the carrying boom 272 is held in a condition positioning the carrying boom 272 in parallel to the fore-and-aft direction of the automobile body to be assembled, as indicated by the phantom lines in FIG. 9.

10. All the clamping and welding units shown in FIGS. 13 to 17b are maintained inoperative.

When, now, the automatic body assembling apparatus which has been held in these conditions is switched in, the first conveying means 32 for the floor panel 20 is actuated so that the floor panel 20 is moved into the predetermined working position over the base structure 96. The floor panel 20 is accurately positioned by means of the locating member 292 shown in FIG. 13. On the other hand, the side panels 22 and 22' are hung on the hook members 70 and 70' of the hanger unit 62 of the second conveying means 34 for the side panels and are positioned to have their longitudinal directions substantially in parallel with the fore-and-aft direction of the floor panel 20 conveyed into the predetermined working position thereof. When the floor panel 20 is accurately held in the working position as above mentioned, the first conveying means 32 is stopped and, in turn, the second conveying means 34 is initiated into action for conveying the side panels 22 and 22' into the predetermined working positions over the floor panel 20 held in the working position. For this purpose, the fluid-operated cylinders 78 and 78' for driving the clamp members 74 and 74' on the hanger unit 62 forming part of the second conveying means 34 are actuated to turn the clamp members 74 and 74' about the shafts 76 and 76' into the positions capturing the upper end portions of the side panels 22 and 22' on the hook members 70 and 70' respectively associated therewith, as indicated by full lines in FIG. 4. The motor 40 on the horizontal beam 38 is then actuated to drive the roller chain 46 in a direction to lower the hanging boom 54 along the rail member 60 on the vertical column 36 until the hanging boom 54 reaches the predetermined lowermost vertical position and is brought into abutting engagement with the stop member 94 (FIG. 3) secured to the lower end portion of the vertical column 36, the lowermost vertical position of the hanging boom 54 being indicated by the phantom lines in FIG. 3. As the hanging boom 54 is thus being moved downwardly, the fluid-operated cylinders 88 and 88' for operating the hanger unit 62 are actuated so that the piston rods 90 and 90' thereof are caused to rearwardly retract from their forwardly extended axial positions which are indicated by the full lines in FIG. 4. The downward projections 86 and 86' of the sliding plates 84 and 84' are consequently brought into driving engagement with the upward projections 80 and 80', respectively, of the sliding members 68 and 68' on the horizontal hook support member 64 of the hanger unit 62 suspending the side panels 22 and 22' from the hook members 70 and 70'. The sliding members 68 and 68' are consequently axially moved away from each other against the opposing forces of the preload springs 72 and 72', respectively. The hook members 70 and 70' integral with the sliding members 68 and 68', respectively, and carrying the side panels 22 and 22', respectively, are accordingly horizontally moved toward each other. The hook members 70 and 70' are moved to the positions remotest from each other as indicated by the phantom lines in FIG. 4, when the stop member 94 on the vertical column 36 (FIG. 3) is hit by the hanging boom 54 moved to the lowermost vertical position thereof.

When the hanger unit 62 is moved to the lowermost position thereof and at the same time the hook members 70 and 70' are moved to the positions remotest from each other, each of the side panels 22 and 22' suspended from the hook members 70 and 70' and clamped by the clamp members 74 and 74', respectively, is received at its lower end on the guiding and positioning surface 134a of the rocking lever 134 forming part of the previously mentioned first guiding and positioning means 124 for the side panels (FIGS. 5 and 6). When the lower end of the side panel 22 strikes against the guiding and positioning surface 134a of the rocking lever 134, the fluid-operated cylinder 144 mounted on the rocking lever 134 is actuated so that the piston rod 148 thereof is caused to forwardly project for driving the control arm 140 to turn counterclockwise of FIG. 6 so that the operating surface 140 of the control arm 140 is forced against the lower end of the side panel 22 and, as a consequence, the side panel 22 is guided on the guiding and positioning surface 134a of the rocking lever 134 and brought into close contact with the surface 134a. The positions of the lower ends of the side panels 22 and 22' relative to the inner side faces of the rockable pillars 100 and 100' in the inclined positions are in this manner determined by the first guiding and positioning means 124. When the side panel 22 is thus securely received on the rocking lever 134, the manipulating means 126 is initiated into action for capturing the side panel 22 at the horizontally extending upper end portion of the side panel 22. For this purpose, the main fluid-operated cylinder 152 shown in FIG. 7a is actuated so that the piston rods 154 and 154' extending in opposite directions are moved away from the inner side face of the rockable pillar 100 so that the support plate 156 movable with the piston rods 154 and 154' is moved toward the upper end portion of the side panel 22 grasped by the combination of the hook member 70 and the clamp member 74 (FIG. 4). The manipulating arms 164 and 164' mounted on the support plate 156 are maintained in the wide open positions indicated by the phantom lines in FIG. 7a when the support plate 156 is moved toward the foremost position thereof. When the support plate 156 is thus moved into the foremost position, the manipulating arms 164 and 164' have their inwardly bent foremost end portions located on both sides of the vertically extending upper end portion of the side panel. The auxiliary fluid-operated cylinder 160 on the support plate 156 is then actuated so that the piston rod 162 thereof is cuased to retract rearwardly, viz., away from the pivotal pin 170 for the link arms 168 and 168'. The pivotal member 166 on the leading end of the piston rod 162 is consequently moved away from the pivotal pin 170 so that the link arms 168 and 168' are caused to turn about the pivotal pin 170 and are thus brought into angularly close positions. The manipulating arms 164 and 164' are consequently moved into the previously mentioned closed positions capturing therebetween the vertically extending upper end portion of the side panel 22, as indicated by the full lines in FIG. 7a. The vertically extending upper end portion of the side panel 22 above mentioned is herein assumed to be the cetner pillar 28 of the side panel. When the side panels 22 and 22' are in this manner supported at their center pillars 28 and 28' by the manipulating means 126 and 126', respectively, the fluid-operated cylinders 78 and 78' of the hanger unit 62 (FIG. 4) are actuated so as to cause the respectively associated clamp members 74 and 74' to turn away from their positions clamping the upper end portions of the side panels 22 and 22' onto the hook members 70 and 70'. The side panels 22 and 22' are consequently released from the hook members 70 and 70'. The reversible motor 40 on the horizontal boom 38 is now actuated to raise the hanging boom 54 into the initial vertical position and, as the hanging boom 54 is thus being moved upwardly, the fluid-operated cylinders 88 and 88' for operating the hanger unit 62 are actuated so that the piston rods 90 and 90' thereof are caused to forwardly extend from the retracted axial positions. The sliding plates 84 and 84' connected to the piston rods 90 and 90' are therefore disengaged from the sliding members 68 and 68' on the hook support member 64 of the hanger unit 62 so that the sliding members 68 and 68' and accordingly the hook members 70 and 70' are moved toward each other by the forces of the preload springs 72 and 72', respectively.

When the manipulating arms 164 and 164' are moved to the angular positions capturing the center pillar 28 of the side panel 22 therebetween as above mentioned, the main fluid-operated cylinder 152 is actuated so that the piston rods 154 and 154' and accordingly the support plate 156 connected thereto are moved toward the inner side face of the rockable pillar 100. The side panel 22 is consequently turned about its lower end toward the inner side face of the rockable pillar 100 from the angular position indicated by phantom lines to the angular position indicated by full lines in FIG. 5. In this instance, the rocking lever 134 of the first guiding and positioning means 124 engaging the lower end of the side panel 22 is rotated together with the fluid-operated cylinder 144 counterlockwise of FIG. 6 about the shaft 136 as the side panel 22 is rotated about the lower end thereof.

While the side panel 22 is thus being moved toward the inner side face of the rockable pillar 100 as above discussed, the previously mentioned second guiding and positioning means 128 (FIGS. 8a and 8b) is initiated into action. When the side panel 22 is moved or turned about its lower end toward the inner face of the rockable pillar 100, the center pillar 28 of the side panel approaches the guiding surface 174a of the first guiding and positioning member 174 (FIG. 7a) and concurrently the rear fender portion of the side panel 22 approaches the guiding surface 176a of the second guiding and positioning member 176 (FIG. 7b). The center pillar 28 and the rear fender portion of the side panel 22 are then brought into sliding contact with the guiding surfaces 174a and 176a of the first and second guiding and positioning members 174 and 176, respectively. As the side panel 22 is moved closer to the inner side face of the rockable pillar 100 in a direction parallel to the lateral direction of the automobile body to be assembled, the center pillar 28 and the rear fender portion of the side panel 22 are caused to slide on the guiding surfaces 174a and 176a and then on the positioning surfaces 174b and 176b of the first and second guiding and positioning members 174 and 176, respectively, in a direction parallel to the fore-and-aft direction of the automobile body to be assembled. When the side panel 22 is turned about its lower end into the angular position closest to the inner side face of the rockable pillar 100 as indicated by the full lines in FIG. 5, the center pillar 28 and the rear fender portion of the side panel 22 are snugly received on the positioning surfaces 174b and 176b of the first and second guiding and positioning members 174 and 176, respectively. The fore-and-aft or longitudinal position of the side panel 22 relative to the floor panel 20 held in the working position is in this manner finally determined by the second guiding and positioning means 128. When the side panel 22 is held in the position closest to the inner side face of the rockable pillar 100 and has its center pillar 28 and the rear fender portion snugly received on the positioning surfaces 174b and 176b of the first and second guiding and positioning members 174 and 176, respectively, then the positioning pin 131 mounted on the rockable pillar 100 (FIG. 5) is aligned with the opening 22a in the side panel 22. The fluid-operated cylinder 133 having the piston rod 133a connected to the positioning pin 131 is thus actuated to move the positioning pin 131 into the opening 22a in the side panel 22 whereby the side panel 22 is accurately held in position relative to the rockable pillar 100. The fluid-operated cylinder 182 associated with the first guiding and positioning member 174 shown in FIG. 7a is then actuated to cause its piston rod 188 to project forwardly so that the clamping lever 178 is rotated about the shaft 190 into an angular position clamping the center pillar 28 of the side panel 22 onto the positioning surface 174b of the first guiding and positioning member 174. The auxiliary fluid-operated cylinder 160 of the manipulating means 126 (FIGS. 7a and 7b) is then actuated to cause its piston rod 162 to project forward so that the manipulating arms 164 and 164' are turned about the pivotal member 166 into the previously mentioned wide open positions indicated by the phantom lines in FIG. 7a. The center pillar 28 of the side panel 22 is consequently released from the manipulating arms 164 and 164'. The main fluid-operated cylinder 152 is then actuated so that the piston rods 154 and 154' and accordingly the support plate 156 are moved away from the inner side face of the rockable pillar 100 into the positions indicated by phantom lines in FIG. 7b. Thereafter, the fluid-operated cylinder 144 of the first guiding and positioning means 124 (FIG. 6) is actuated to cause the piston rod 148 to retract rearward so that the control arm 140 is turned clockwise of FIG. 6 about the shaft 142 on the clamping lever 134 into the position indicated by phantom lines, learing a path for the movement of the side panel 22 to the final working position in which the side panel 22 is to be welded to the floor panel 20.

As the side panels 22 and 22' are in this manner being moved to the predetermined relative positions to the inner side faces of the rockable pillars 100 and 100' in the inclined positions, the cowl-and-dash-panel subassembly 24 and the parcel shelf member 26 are loaded on the overhead travelling crane 196 and the slewing lift mechanism 262 (FIG. 9). For this purpose, the fluid-operated cylinder 238 is actuated to cause the piston rod 240 to forwardly project so that the clamping levers 230 and 232 are turned about the shafts 234 and 236, respectively, into the previously mentioned second angular positions grasping therebetween a predetermined portion of the cowl-and-dash-panel subassembly 24, as indicated by the full lines in FIG. 11. The cowl-and-dash-panel subassembly 24 is thus suspended from the two clamping assemblies 222 and 222' (FIG. 10) of the hanger unit 204. When the clamping levers 230 and 232 of the clamping assembly 222 are moved to the angular positions clamping the cowl-and-dash-panel subassembly, the projection 230a formed on the clamping lever 230 is brought into abutting engagement with the actuating element 260a of the second limit switch 260 (FIG. 11) so that the fluid-operated cylinder 282 for driving the hanger unit 204 (FIG. 10) is actuated to raise the hanger unit 204 along the guide rods 206 and 206'. When the hanger unit 204 is moved into the uppermost vertical position and thus hits the upper limit switch 212 (FIG. 10), then the fluid-operated cylinder 200 associated with the saddle 198 on the horizontal girder 192 is actuated so that the saddle 198 is horizontally moved along the rail members 194 and 194' on the girder 192 (FIG. 9). When the saddle 198 is moved into a predetermined position over the floor panel 20 held in the working position thereof, then the fluid-operated cylinder 200 is stopped and, thereafter, the fluid-operated cylinder 208 associated with the hanger unit 204 is actuated to lower the hanger unit 204 to a predetermined lowermost position and hits the lower limit switch 212'. When the hanger unit 204 is moved into the lowermost position thereof, the cowl-and-dash-panel subassembly 24 suspended from the clamping assemblies 222 and 222' of the unit is positioned between the side panels 22 and 22' which have been held in the fixed relative positions to the rockable pillars 100 and 100', as will be seen from FIG. 9. The cowl-and-dash-panel subassembly 24 is then clamped by clamping means forming part of the arrangement illustrated in FIG. 13. When the cowl-and-dash-panel subassembly 24 is thus securely held in the predetermined working position thereof, the fluid-operated cylinder 238 of the clamping assembly 222 is actuated to turn the clamping levers 230 and 232 into the previously mentioned first angular positions, releasing therefrom the cowl-and-dash-panel subassembly 24. When the clamping levers 230 and 232 are thus moved into the first angular positions thereof, the actuating element 258a of the first limit switch 258 (FIG. 11) is hit by the projection 230a of the clamping lever 230 so that the fluid-operated cylinder 208 for driving the hanger unit 204 (FIG. 10) is actuated to raise the hanger unit 204 toward the initial uppermost position thereof. When the hanger unit 204 reaches the uppermost position and hits the upperlimit switch 212, then the fluid-operated cylinder 200 (FIG. 9) is actuated to move the saddle 198 on the rail members 194 and 194' toward the end of the girder 192 and thereafter the fluid-operated cylinder 208 for the hanger unit 204 is actuated to lower the hanger unit 204 to the predetermined lowermost position.

As the cowl-and-dash-panel subassembly 24 is being thus moved into the working position thereof, the slewing lift mechanism 262 (FIGS. 9 and 12) is initiated into action for conveying the parcel shelf member 26 into the predetermined working position thereof. For this purpose, the parcel shelf member 26 is first suspended from the clamping assemblies 288 and 288' of the hanger unit 280 which is held in the lowermost vertical position with the carrying boom 272 maintained in a position parallel to the fore-and-aft direction of the automobile body structure to be assembled. When the hanger unit 280 is thus loaded with the parcel shelf member 26, then the fluid-operated cylinder 268 positioned at the bottom of the vertical column 264 so that the movable post 266 is moved a distance $h_1$ upwardly from its lowermost position indicated by the full lines in FIG. 12. When the movable post 266 and accordingly the carrying boom 272 cantilevered to the movable post 266 are moved into the uppermost vertical positions thereof, the hydraulic motor 274 positioned on the disc member 270 at the top of the movable post 266 is actuated to turn the carrying boom 272 about the axis of the movable post 266 through an angle of about 90° so that the hanger unit 280 and accordingly the parcel shelf member 26 are positioned over a predetermined portion of the floor panel 20 which has been conveyed into the working position thereof. The fluid-operated cylinder 278 for driving the movable post 266 is then actuated to lower the movable post 266 and the carrying boom 272 which now extends in a direction transverse to the fore-and-aft direction of the automobile body structure to be assembled. When the carrying boom 272 is thus moved into the predetermined lowermost vertical position which is indicated by the full lines in FIG. 12, then the fluid-operated cylinder 282 carried by the supporting block 276 on the leading end portion of the carrying boom 272 is actuated so that the piston rod 284 thereof is moved downwardly so as to lower the hanger unit 280 away from the carrying boom 272 along the guide rods 278 and 278' over a distance which is indicated by $h_2$. When the hanger unit 280 is moved into the predetermined lowermost vertical position indicated by the full lines in FIG. 12, the parcel shelf member 26 suspended from the clamping assemblies 288 and 288' of the hanger unit 280 is held in a predetermined working position relative to the floor panel 20 and the side panels 22 and 22' which are still carried on the rockable pillars 100 and 100' through the second guiding and positioning means 128 and 128' and the position holding means 130 and 130' (FIG. 3). When the parcel shelf member 26 is thus held in the working position thereof, the clamping assemblies 288 and 288' of the hanger unit 280 (FIG. 12) are released from the parcel shelf member 26 and thereafter the parcel shelf member 26 is clamped in the working position by means of, for example, the clamping members 354 and 354' forming part of the multiple-electrode spot welding gun assembly 316 illustrated in FIGS. 17a and 17b. When the parcel shelf member 26 is thus securely held or clamped in the working position, then the fluid-operated cylinders 268 and 282 and the hydraulic motor 274 of the slewing lift mechanism 262 (FIG. 12) are actuated to move the carrying boom 272 and the hanger unit 280 into the initial positions for being loaded with a parcel shelf member for a next assembling operation.

When the floor panel 20, the side panels 22 and 22', the cowl-and-dash-panel subassembly 24 and the parcel shelf member 26 are thus held and clamped in the predetermined positions relative to each other over the base structure 96, then the fluid-operated cylinders 104 and 104' associated with the rockable pillars 100 and 100' (FIG. 3) are actuated to cause their piston rods 106 and 106' to project forward for turning the rockable pillars 100 and 100' about the shafts 102 and 102' on the brackets 98 and 98', respectively, until the rockable pillars 100 and 100' assume the upright positions and are locked in the upright positions by the locking means 110 and 110'. The side panels 22 and 22' carried by the rockable pillars 100 and 100' thus moved into the upright positions are now in the working positions ready to be welded to the floor panel 20, the cowl-and-dash-panel subassembly 24 and the parcel shelf member 26.

The multiple-electrode spot welding gun assemblies 320 and 322 shown in FIG. 14 are first actuated so that the welding gun of the gun assembly 320 is driven to reciprocatingly move as indicated by an arrow $a$ and at the same time the welding gun of the gun assembly 322 is driven to oscillatorily turn as indicated by an arrow $b$ for welding the side panels 22 and 22' are welded to the side edges of the cowl-and-dash-panel subassembly 24. Likewise, the side panels 22 and 22' are welded to the side edges of the floor panel 20 by means of the welding means including the multiple-electrode spot welding gun assemblies 324 and 326 shown in FIG. 14. The gun assembly 298 (FIGS. 13, 14, 15a and 15b) is rotated about the main spindle 332 by means of the hydraulic motor 334 so that the welding gun 336 thereof is initiated into action to weld the cowl-and-dash-panel subassembly 24 to the side panels 22 and 22', whereas the first and second multiple-electrode spot welding gun assemblies 314 and 318 (FIGS. 13, 16a and 16b; FIGS. 13, 17a and 17b) are actuated for welding the parcel shelf member 26 to the rear portions of the side panels 22 and 22'. Upon completion of the welding operation, all the positioning and clamping units that have been in engagement with the floor panel 20, the side panels 22 and 22', the cowl-and-dash-panel subassembly 24 and the parcel shelf member 26 which are now assembled together into a unitary body structure (FIG. 1) are disengaged therefrom. The previously mentioned first conveying means 32 (FIG. 2) now carrying thereon the assembled body structure is actuated for moving the body structure into a subsequent stage of operation. The fluid-operated cylinders 104 and 104' associated with the rockable pillars 100 and 100' are then actuated to move the rockable pillars 100 and 100' into the inclined positions illustrated in FIG. 3.

From the following description it will now be appreciated that the apparatus and method according to the present invention is useful for fully automating the assembling operation of an automobile body structure and will thus contribute to elimination of a time-consuming and costly human labour for the assemblage of the body structure. Since, in particular, the side panels are initially held in horizontally close positions and are moved toward the positions horizontally spaced wider apart from each other, no strict consideration need be paid in the designing of the assembling apparatus for providing an ample space for accommodating the downward movement of the side panels conveyed to the working positions thereof.

What is claimed is:

1. A method of assembling an automobile body structure, comprising the steps of:
   providing an automobile body floor panel and a pair of automobile body side panels;
   conveying the floor panel to a predetermined substantially horizontal working position;
   vertically suspending the side panels in a closely horizontally spaced condition;
   downwardly conveying the side panels and simultaneously gradually increasing the horizontal spacing between the side panels to position the side panels at first temporary positions above said working position and horizontally spaced parallel to each other and extending substantially parallel to the fore-and-aft direction of the floor panel;
   positioning the respective lower ends of the side panels laterally of said floor panel at predetermined lateral positions respectively on opposite sides of the floor panel;
   positioning the side panels longitudinally of the floor panel at predetermined fore-and-aft positions relative to the floor panel;
   tilting the side panels away from each other about said respective lower ends of the side panels to second temporary positions;
   moving the side panels laterally inwardly of the floor panel to position the side panels for welding the same to the floor panel; and
   welding the side panels to the floor panel to form a unitary automobile body structure.

2. A method of assembling an automobile body structure according to claim 1, further comprising the steps of:
   providing a cowl-and-dash-panel subassembly;
   conveying the cowl-and-dash-panel subassembly in a direction parallel to the lateral dimension of the floor panel to a predetermined position above said working position;
   lowering the cowl-and-dash-panel subassembly to a predetermined position adjacent the side panels for welding the same to the cowl-and-dash-panel subassembly; and
   welding the cowl-and-dash-panel subassembly to the side panels.

3. A method of assembling an automobile body structure according to claim 1, further comprising the steps of:
   providing a parcel shelf;
   conveying the parcel shelf to a predetermined position above said working position;
   lowering the parcel shelf to a predetermined position adjacent the side panels for welding the same to the parcel shelf; and
   welding the parcel shelf to the side panels.

4. An apparatus for automatically assembling an automobile body structure, comprising first conveying means for moving a floor panel into a substantially horizontal working position, jig means including at least one pair of elongate rockable members which are rockable about respective axes located in the vicinity of the lower ends of the rockable members and extending substantially in parallel to the fore-and-aft direction of the body structure to be assembled, said rockable members being rockable between substantially upright positions on both sides of the body structure to be assembled and inclined positions which are inclined away from each other about said axes, second conveying means for concurrently moving a pair of side panels downwardly into first temporary positions between and respectively adjacent to the rockable members in said inclined positions, first guiding and positioning means mounted on each of said rockable members and engageable with the lower end of said panel adjacent to the rockable member for guiding the lower end of the side panel into a predetermined lateral position relative to the associated rockable member held in the inclined position thereof, manipulating means mounted on each of said rockable members and engageable with a predetermined upper portion of the associated side panel for supporting the side panel with the lower end of the side panel held in said predetermined lateral position, second guiding and positioning means mounted on each of said rockable members and engageable with at least one predetermined portion of the associated side panel for guiding the side panel into a predetermined fore-and-aft position relative to the associated rockable member in the inclined position so that the side panels are moved into second temporary positions, position holding means mounted on each of said rockable members and movable into locking engagement with the associated side panel in said second temporary position thereof, said rockable members being held in said inclined positions when the side panels are being moved from said first temporary positions into said second temporary positions and being moved from the inclined positions into said upright positions when the side panels are engaged by said position holding means for thereby moving the side panels into respective working positions ready to be welded to the floor panel in the working position thereof, and welding means for automatically welding the side panels to the floor panel.

5. An apparatus as set forth in claim 4, further comprising third conveying means for conveying a cowl-and-dash-panel subassembly into a predetermined working position ready to be welded to said side panels, said third conveying means comprising a stationary horizontal member extending over a predetermined front portion of the automobile body to be assembled and in a direction parallel to the lateral direction of the body structure to be assembled, a crane movable along said horizontal member and including a hanger unit which is vertically movable toward and away from said horizontal member and which is operative to releasably suspend therefrom the cowl-and-dash-panel subassembly, said crane being movable between a first horizontal position ready to be loaded with the cowl-and-dash-panel subassembly and a second horizontal position over and substantially aligned with said predetermined front portion of the body structure to be assembled, said hanger unit being movable between an uppermost vertical position and a lowermost vertical position adapted to carry the cowl-and-dash-panel subassembly in the predetermined working position thereof, first drive means for moving said crane between said first and second horizontal positions, second drive means for moving said hanger unit between said uppermost and lowermost vertical positions, and welding means operative to automatically weld the cowl-and-dash-panel subassembly to said side panels when the cowl-and-dash-panel subassembly and the side panels are held in the predetermined working positions thereof.

6. An apparatus as set forth in claim 4, further comprising fourth conveying means for conveying a parcel shelf member into a predetermined working position ready to be welded to said side panels, said fourth conveying means comprising a vertically movable member which is vertically movable between predetermined uppermost and lowermost vertical positions, a horizontal carrying boom supported by said vertically movable member and horizontally rotatable about an axis of said vertically movable member between a first angular position ready to be loaded with the parcel shelf member and a second angular position having its leading end portion located over a predetermined rear portion of the automobile body structure to be assembled, a hanger unit depending from said leading end portion of said carrying boom and vertically movable between a predetermined uppermost position and a predetermined lowermost position adapted to hold the parcel shelf member in said predetermined working position thereof, first drive means for moving said vertically movable member between said predetermined uppermost and lowermost vertical positions, second drive means for moving said carrying boom between said predetermined first and second angular positions, third drive means for moving said hanger unit between said uppermost and lowermost vertical positions thereof, and welding means for automatically welding the parcel shelf member to the side panels when the parcel shelf member and the side panels are held in the respective predetermined working positions thereof.

7. An apparatus as set forth in claim 4, in which said second conveying means comprises a hanger unit vertically movable between predetermined uppermost and lowermost vertical positions above said working position of the floor panel and including a pair of clamping assemblies which are operative to respectively suspend the side panels therefrom and which are movable between first positions closest to each other and second positions remotest from each other in a direction substantially parallel to the lateral direction of the automobile body structure to be assembled, first drive means for driving said hanger unit between said predetermined uppermost and lowermost vertical positions, and second drive means for moving said clamping assemblies between said first and second positions thereof, said clamping assemblies being held in said first positions when the hanger unit is held in said predetermined uppermost vertical position and being moved toward said second positions thereof as the hanger unit is moved from said uppermost vertical position toward the lowermost vertical position so that the side panels suspended from the clamping assemblies are held in said first temporary positions when said hanger unit is moved into said lowermost position thereof and the clamping assemblies are moved into the second positions thereof.

8. An apparatus as set forth in claim 7, wherein said hanger unit further includes a horizontal support member, a pair of horizontally movable members extending in line with each other and axially movably mounted on said horizontal support member, said first horizontally movable members being respectively connected to said clamping assemblies and movable with the clamping assemblies between positions corresponding to said first and second positions of the clamping assemblies, and resilient biasing means for urging said first horizontally movable members toward the positions providing the first positions of the clamping assemblies, said second drive means comprising a pair of movable members which are vertically movable with said hanger unit and which are horizontally movable in directions parallel to the direction of movement of said horizontally movable members on said horizontal support member and fluid-operated cylinders for moving the movable members of the second drive means between first positions disengaged from said horizontally movable members for allowing said horizontally movable members to be moved into the positions corresponding to the first positions of said clamping members by the forces of said resilient biasing means and second positions in driving engagement with said horizontally movable members for driving the horizontally movable members into the positions providing said second positions of said clamping assemblies against opposing forces of said resilient biasing means.

9. An apparatus as set forth in claim 4, in which said first guiding and positioning means comprises a rocking lever rotatable about an axis extending substantially in parallel to the fore-and-aft direction of the automobile body structure to be assembled and formed with a guiding and positioning surface which is configured to be snugly engageable with the lower end of the associated side panel, a control arm pivotally mounted on said rocking lever and movable into an angular postion engageable with the lower end of the side panel for guiding and positioning the lower end of the side panel into close contact with said guiding and positioning surface when the side panel is moved into said first temporary position thereof by said second conveying means, and drive means for driving the control arm into and out of said position engageable with the lower end of the side panel.

10. An apparatus as set forth in claim 9, in which said control arm is movable into an angular position clearing a path for the movement of the side panel toward the floor panel when the rockable member on which rocking lever is mounted is moved from the inclined position toward the upright position thereof.

11. An apparatus as set forth in claim 4, in which said manipulating means comprises an elongate support member movable between first and second longitudinal positions respectively corresponding to said first and second temporary positions of the associated side panel, first drive means for moving the support member between said first and second longitudinal positions thereof, a pair of manipulating arms pivotally mounted on said support member and movable into operative positions engageable with said predetermined upper portion of the side panel in said first and second temporary positions thereof, and second drive means movable with said support member for moving said manipulating arms into and out of said operative positions thereof.

12. An apparatus as set forth in claim 4, in which said second guiding and positioning means comprises at least one guiding and positioning member formed with a guiding surface engageable with said predetermined portion of the associated side panel when the side panel is moved into said first temporary postion and a positioning surface merging out of said guiding surface and arranged to hold the side panel in said predetermined fore-and-aft position relative to the associated rockable member when said predetermined portion of the side panel is snugly received on the positioning surface.

13. An apparatus as set forth in claim 12, in which said second guiding and positioning means further comprises a clamping member pivotally mounted on said guiding and positioning member and engageable with said predetermined portion of said side panel for clamping the predetermined portion of the side panel onto said positioning surface of the guiding and positioning member when moved into an angular position engageable with said portion of the side panel.

* * * * *